United States Patent
Parsley et al.

(10) Patent No.: US 12,359,762 B2
(45) Date of Patent: Jul. 15, 2025

(54) PIPELINE ISOLATION TOOL WITH LARGE-GAP SEALING ELEMENT HAVING MINI PRESSURE HEADS AND IRIS-LIKE STRUCTURAL SEALING ELEMENTS

(71) Applicant: TDW Delaware, Inc., Wilmington, DE (US)

(72) Inventors: Cody A. Parsley, Tulsa, OK (US); Jared Sickles, Tulsa, OK (US); Aaron M. Ritchie, Tulsa, OK (US); Jack McCall, Owasso, OK (US)

(73) Assignee: TDW Delaware, Inc., Wilmington, DE (US)

( * ) Notice: Subject to any disclaimer, the term of this patent is extended or adjusted under 35 U.S.C. 154(b) by 492 days.

(21) Appl. No.: 17/579,323

(22) Filed: Jan. 19, 2022

(65) Prior Publication Data

US 2022/0228690 A1    Jul. 21, 2022

Related U.S. Application Data

(60) Provisional application No. 63/139,598, filed on Jan. 20, 2021.

(51) Int. Cl.
*F16L 55/132* (2006.01)
*F16J 15/06* (2006.01)

(52) U.S. Cl.
CPC ............. *F16L 55/132* (2013.01); *F16J 15/06* (2013.01)

(58) Field of Classification Search
CPC ................................. F16L 55/132; F16J 15/06
USPC ............................................................ 138/89
See application file for complete search history.

(56) References Cited

U.S. PATENT DOCUMENTS

| | | | |
|---|---|---|---|
| 4,600,036 A * | 7/1986 | Noe | F16L 55/136 138/89 |
| 4,658,860 A | 4/1987 | Reaux | |
| 4,760,868 A * | 8/1988 | Saxon | F16L 55/136 D23/200 |
| 4,854,384 A * | 8/1989 | Campbell | F16L 55/32 166/134 |
| 5,293,905 A | 3/1994 | Friedrich | |
| 6,050,613 A * | 4/2000 | Wartluft | F16L 47/12 285/179 |

(Continued)

FOREIGN PATENT DOCUMENTS

| | | |
|---|---|---|
| IE | 20110157 | 3/2012 |
| WO | 0201174 A1 | 1/2002 |
| WO | 2022026919 A1 | 2/2022 |

*Primary Examiner* — David R Deal
(74) *Attorney, Agent, or Firm* — GableGotwals

(57) ABSTRACT

A pipeline isolation tool (10) with a circumferential seal (30) having a T-shaped cross section. The seal has a radially oriented lower seal profile (36) and an axially oriented upper seal profile (38). Pressure heads (40, 50) are located on either side (32, 34) of the lower profile. Overlapping structural elements (60, 80) are located on either side (32, 34) of the upper profile and include a concave area (70, 90) for receiving a portion of the upper seal profile. The inner face (64, 84) of the structural elements contact the outer surfaces (42, 52) of the pressure heads. Angle plates (100, 110) define an inner face (102, 112) that contacts an outer face (66, 86) of each of the structural elements. The tool may be configured as an intrusive tool or as a non-intrusive tool.

38 Claims, 30 Drawing Sheets

(56) References Cited

U.S. PATENT DOCUMENTS

| | | | | |
|---|---|---|---|---|
| 6,116,285 | A | * | 9/2000 | Wilson ................ F16L 55/1108 138/92 |
| 7,108,017 | B2 | * | 9/2006 | Kraus .................... B62D 25/24 138/92 |
| 7,841,364 | B2 | | 11/2010 | Yeazel et al. |
| 10,436,372 | B2 | | 10/2019 | Bjorsvik et al. |
| 10,989,347 | B2 | | 4/2021 | McKone et al. |
| 2019/0390814 | A1 | | 12/2019 | McKone et al. |
| 2022/0034440 | A1 | * | 2/2022 | Giles ..................... F16L 55/136 |
| 2023/0213133 | A1 | * | 7/2023 | Naber ................... F16L 55/124 138/89 |

* cited by examiner

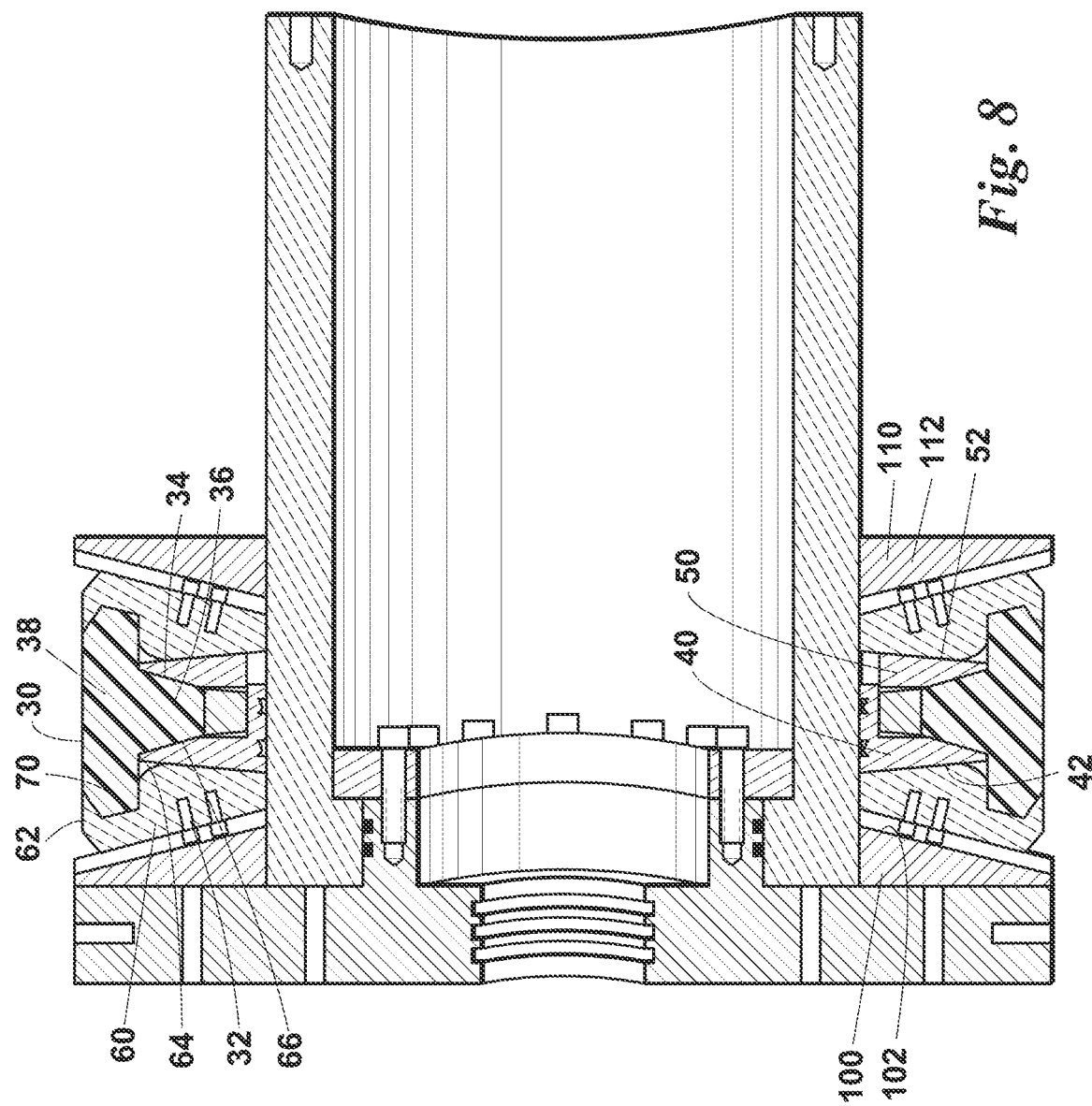

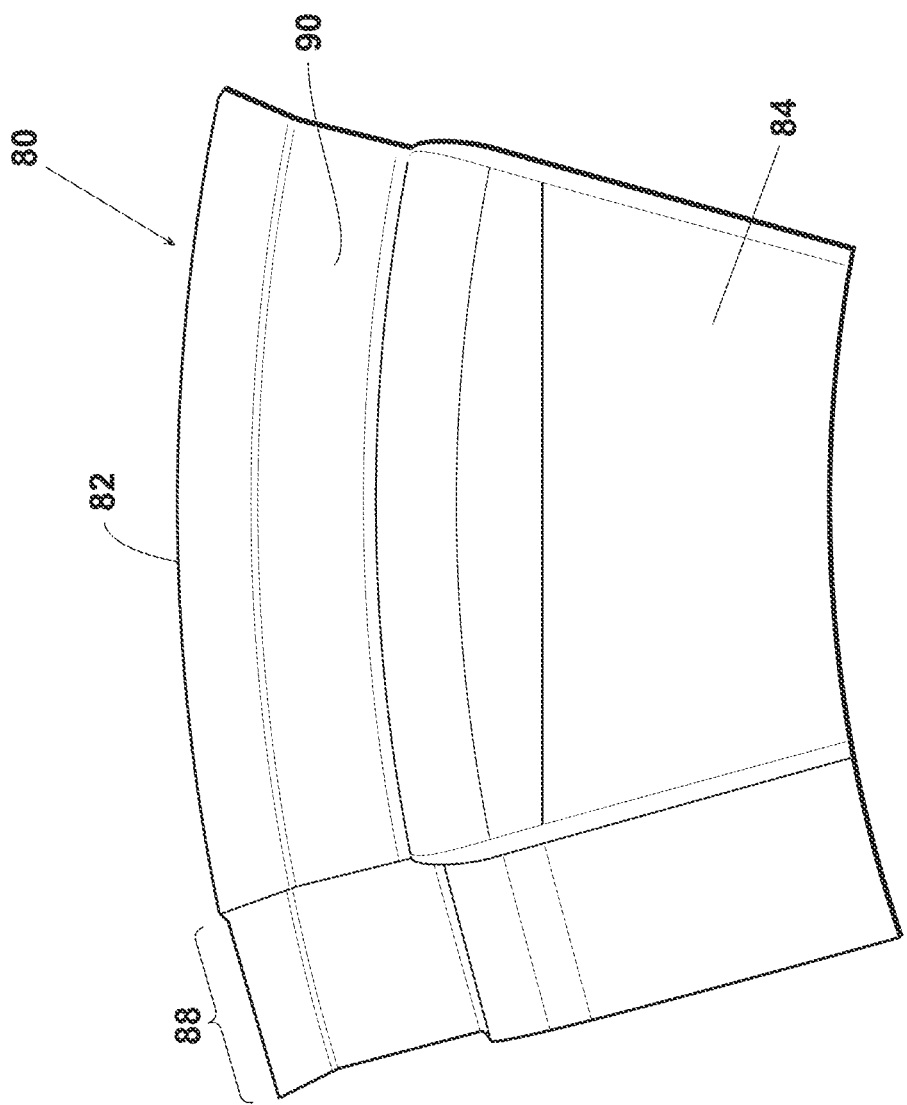
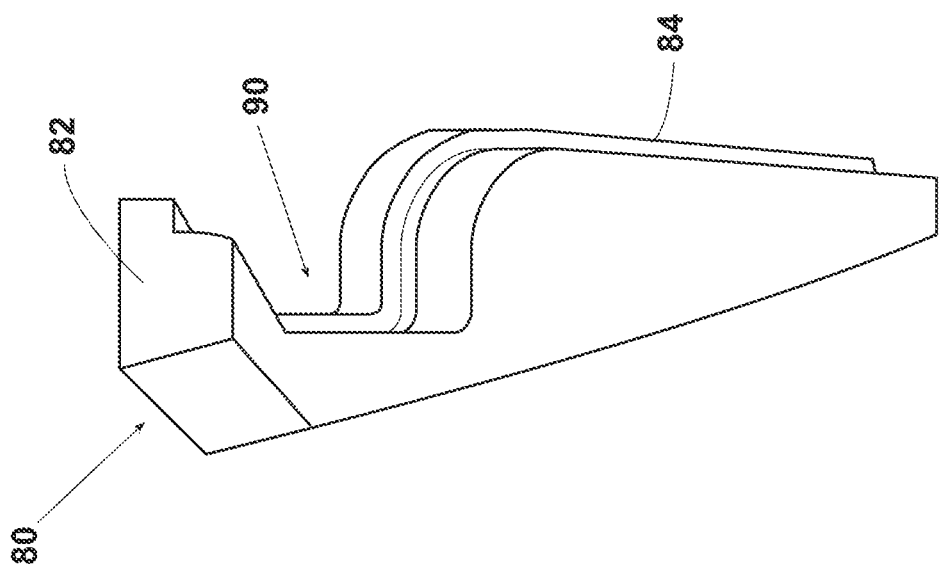

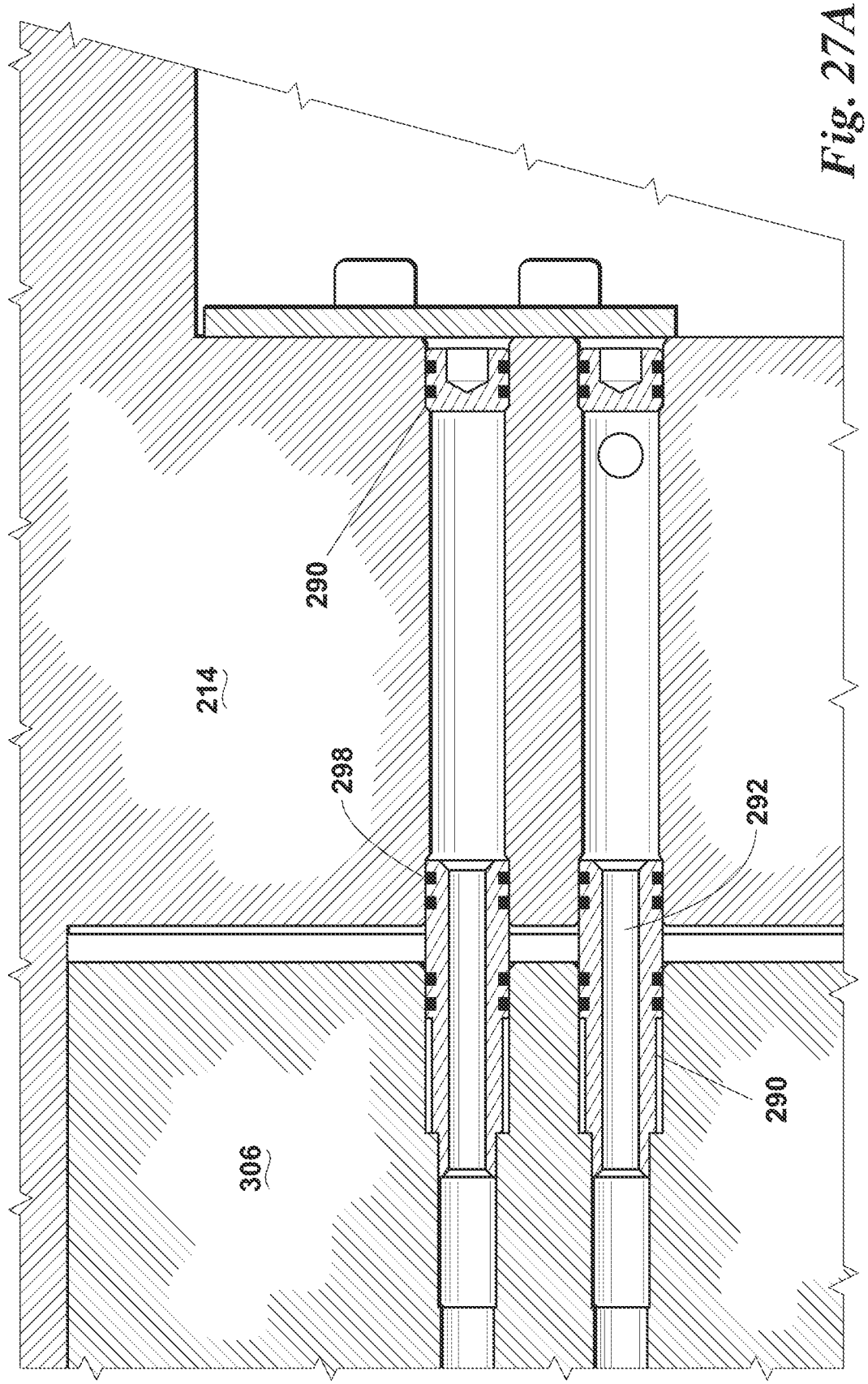

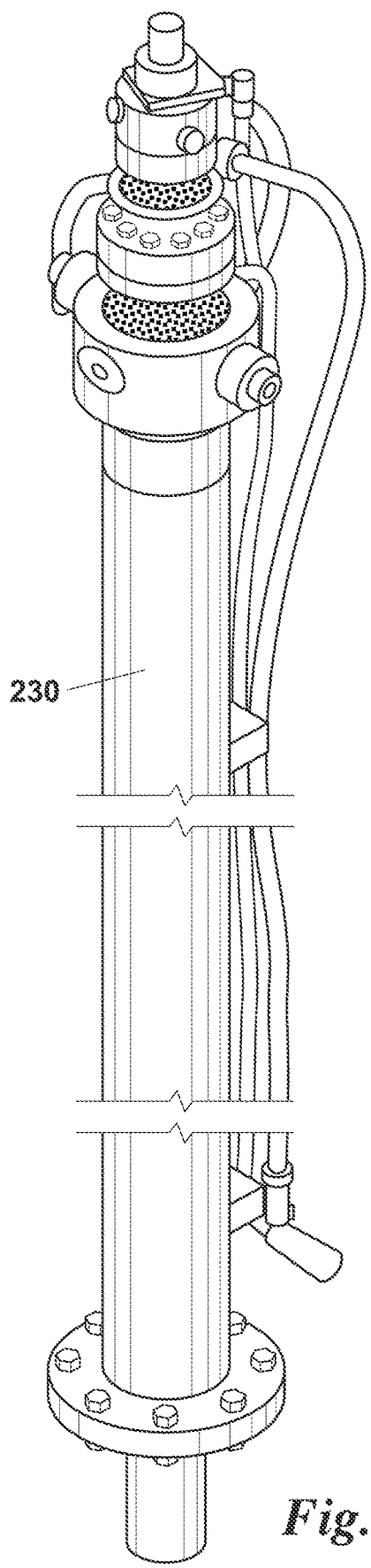
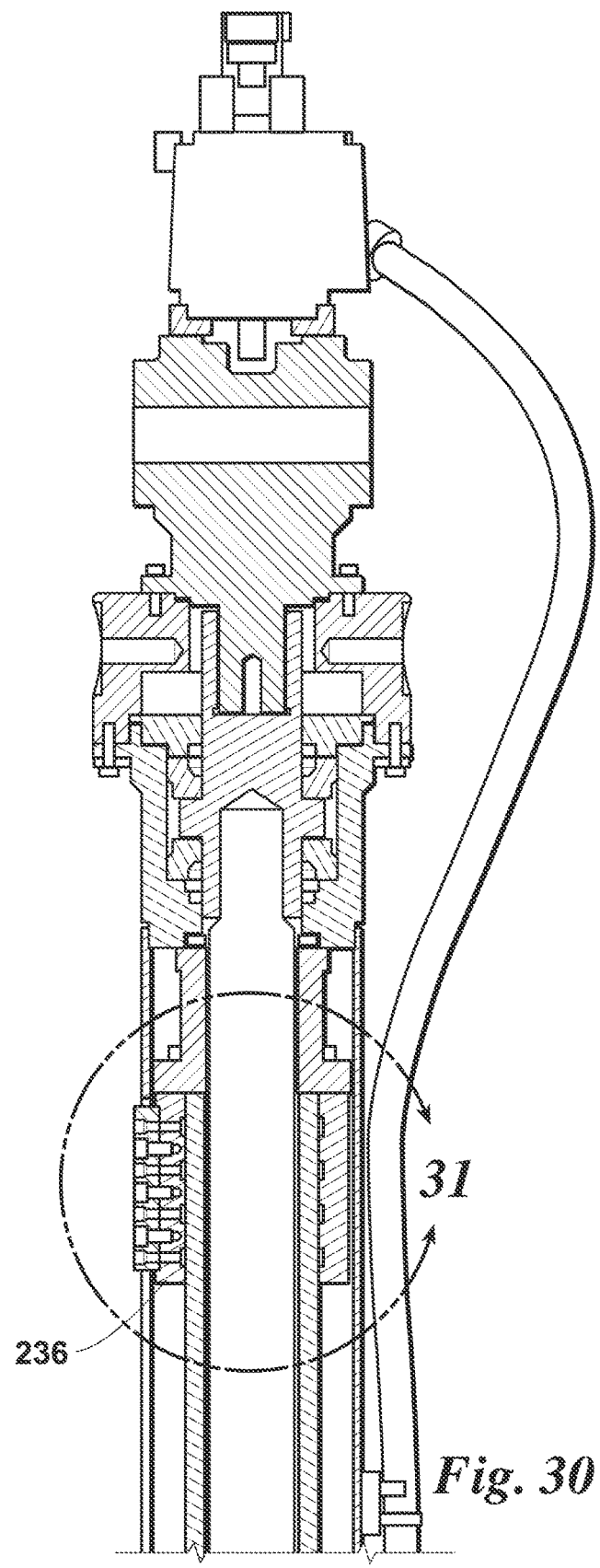
Fig. 29
Fig. 30

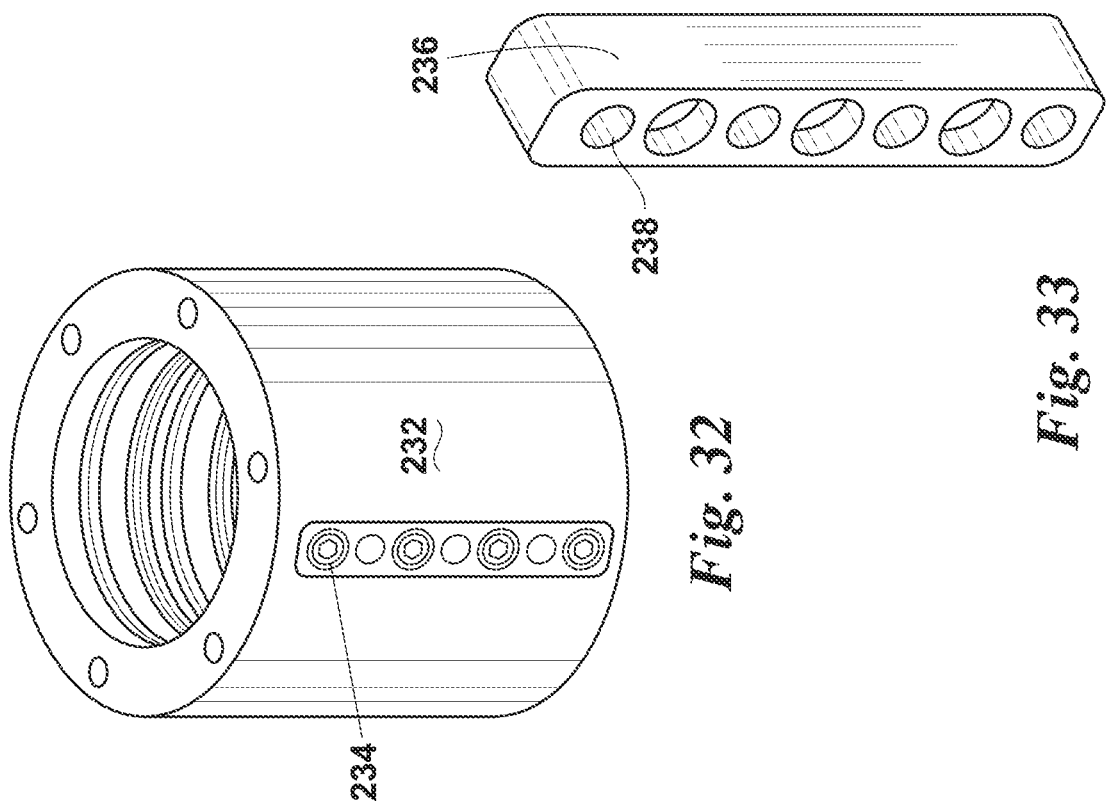
Fig. 32
Fig. 33
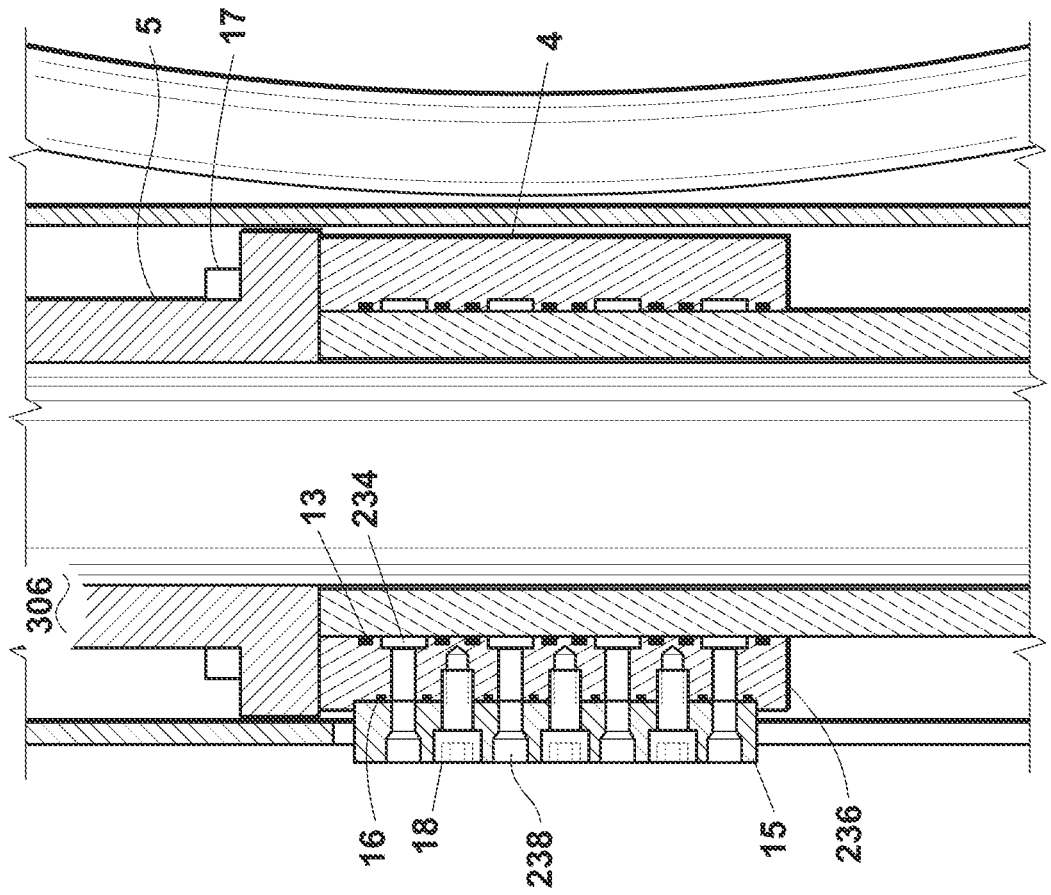
Fig. 31

PIPELINE ISOLATION TOOL WITH LARGE-GAP SEALING ELEMENT HAVING MINI PRESSURE HEADS AND IRIS-LIKE STRUCTURAL SEALING ELEMENTS

CROSS-REFERENCE TO RELATED APPLICATIONS

This application claims the priority of U.S. Provisional Patent Application No. 63/139,598 titled "PIPELINE ISOLATION TOOL WITH LARGE-GAP SEALING ELEMENT HAVING MINI PRESSURE HEADS AND IRIS-LIKE STRUCTURAL SEALING ELEMENTS," filed Jan. 20, 2021, the contents of which are incorporated by reference herein.

BACKGROUND

This disclosure relates to pipeline tools designed to block product flow during pipeline maintenance and repair operations. In particular, this disclosure relates to seals that are used on the plugging heads or modules of these types of tools when having to span a large gap between the seal in its unset and set positions. For purposes of this application, a large gap means a seal gap extrusion where the ratio of pipeline inner diameter to tool outer diameter is greater than approximately 1.10.

Prior art large-gap seals can exhibit high strain or strain gradients when activated to the set position and then forced inward radially to seal against its unset inner diameter. The absolute strain levels in the seal may or may not be of major significance to damage of the elastomer. Where structural segments are used to reinforce the seal, there is a potential danger of segments flipping or experiencing permanent deformation at high isolation pressures that would cause jamming of the segments and prevent the seal from retracting. Point loads of the structural segments to the inner pipe wall can introduce high stress peaks that may cause damage to the pipe as well as difficulties when trying to achieve compliance with the pipeline standards.

Creep crack growth can be a primary cause of failure when the seal is under load for extended periods of time. The complexity of the seal side profile may be directly related to the risk of crack initiation. The selection of a more "exotic" material that is not susceptible to creep crack growth is expensive due to low volume and potential requirement for unconventional manufacturing methods. The complexity of the seal side profile directly affects manufacturing cost. Additionally, in large-gap seal designs, the required piston stroke is large, making the tool long and therefore less piggable. The length of the tool reduces the benefits of the high expansion sealing capability.

SUMMARY

Embodiments of an isolation tool of this disclosure are intended for intrusive (hot tap) applications and can span a large gap by way of "T-bone" or T-shaped" seal, with pressure heads on each side of the lower profile of the seal that act as support and prevent extrusion of the seal ID. Structural support elements that overlap one another provide support to the upper profile of the seal. Embodiments may also be arranged for non-intrusive applications in which the tool is pigged into a predetermined location within the pipeline.

Because the pressure heads located on each side of the lower profile of the seal have a diameter (radial height) less than that of the sealing element when the sealing element is in its unset position, this disclosure sometimes refers to the heads as "mini" pressure heads. The heads are also smaller in size than the angle plates that apply pressure to the seal through the structural elements and the mini-pressure heads.

The structural elements are overlapping structural elements that act like an iris. The structural elements eliminate the use of gap segments like those used in the prior art. See e.g. U.S. Pat. No. 10,436,372 B2 to Bjorsvik et al, the contents of which are incorporated by reference herein. This arrangement provides more options to seal around a primary seal such as, for example, a seal on a pressure head or bowl side.

For purposes of this disclosure, a large gap means a seal gap extrusion where the ratio of pipeline inner diameter to tool outer diameter is greater than approximately 1.10 (e.g. 10% radial expansion).

Advantages of the embodiments of this disclosure include:
a) Elimination or reduction of the risk of elastomer tearing;
b) Allowing for control of the amount of seal squeeze and thus the seal contact pressure;
c) Elimination of tilting of supporting segments;
d) Simplifying the side profile of the seal compared to prior art large gap seal designs;
e) Elimination of the need for "exotic" materials for the seal and reduce the cost of manufacturing;
f) Allowing for size scaling;
g) Allowing for low- and high-pressure isolations;
h) Reduction in the amount of required piston stroke (compared to prior art designs) and therefore shorter overall length of the tool;
i) Elimination of the need for a secondary sealing head, a primary (high pressure side) sealing head being sufficient;
j) Allowing sealing of large gaps, including gaps above 20% radial expansion.

Embodiments of this disclosure may be used in a pipeline isolation tool like that disclosed in U.S. Pat. No. 10,989,347 to McKone et al. ("McKone"), the content of which is incorporated by reference herein. The tool, for example, may include a pair of plugging heads, one being on the higher pressure side of the tool and serving as the primary seal, the other being on the lower pressure side of the seal and serving as the secondary seal. The tool, therefore, defines two independent sealing systems and two independent locking systems. In some embodiments of the tool, a single plugging head is used.

Regardless of whether a single plugging head or a pair of plugging heads is used, in some embodiments the hydraulically actuated piston is encased in a hydraulic cylinder formed at least in part by each of the two pressure heads. The cylinder head may be formed by an opposing pressure head of that forming the cylinder body.

A pipeline isolation tool of this disclosure includes a sealing element having an expanding, reusable seal wherein one seal may be used for a wide range of pipe wall thickness of the same nominal size. The seal can be self-energizing, its actuating force being in a same direction as a force from isolation pressure.

The structural segments of this disclosure allow for a larger range of extrusion with higher pressure retention capabilities. The plugging head may use a hydraulically activated piston and cylinder arrangement to compress the seal axially which, in turn, expands the seal radially for sealing against the pipe wall. The structural segments slide radially with the seal, maintaining a degree of overlap with one another and supporting the extruded rubber against the differential pressure.

The tool may include some machining and assembly methods to deliver hydraulic fluid from a location outside the excavation, to the jackscrew, connect through multiple components and ultimate control double acting pistons in the plugging heads. In some embodiments, the tool includes a control bar that contains a hydraulic transfer sleeve and manifold. The manifold is arranged for connection to external fluid lines, the sleeve providing the fluid to the inside of the tool. Transfer pins may be used to transfer fluid between components. In embodiments, the end of the piston may include trapezoidal shaped threads that accommodate variable spacing between components and require less precision in their placement during assembly. Spacing between the components may be off by up to one full turn and still accommodated.

Some embodiments of the tool include an tool of this disclosure include an arcuate-shaped bumper that makes contact with the ID of the pipe to distribute forces experienced by the tool back into the pipe when sealing against the pipe. The bumper may be cam-actuated, for example, connected to an arm that moves into contact with the ID of the pipe as the tool enters the pipe and moves into a position ready for sealing against the ID. In other embodiments, the cam-actuated arm arrangement may be replaced by a bumper connected to an arm or body that is hydraulically actuated.

An additional feature in some embodiments is a urethane disc mounted on the front of the tool that pushes chips away from sealing surfaces. This "chip sweep" makes it easier to form a seal. The sweep may be replaced or supplemented by a nozzle that injects fluid ahead of the tool.

The tool may be arranged as an intrusive tool. It may also be arranged as a non-intrusive tool, including gripping means and an hydraulic actuation cylinder in communication with the sealing and gripping means.

BRIEF DESCRIPTION OF THE DRAWINGS

FIG. 8 is a cross-section view of the seal of FIG. 7.

FIG. 12 is a rear elevation view of the element of FIG. 9.

FIG. 13 is a left side elevation view of the element of FIG. 9.

FIG. 27A is a cross-section view illustrating the transfer pin located along a hydraulic fluid passageway between two adjacent components of the isolation tool.

FIG. 29 is an embodiment of an actuator bar for use with isolation tools of this disclosure. The actuator includes an hydraulic transfer sleeve (FIG. 32) that contains a manifold (FIG. 33) that passes hydraulic fluid from outside of the pipe into the isolation tool.

FIG. 30 is a cross-section view of an upper end of the actuator bar indicated by section 30 of FIG. 29.

FIG. 31 is a cross-section view of a portion of the upper end of the actuator bar indicated by section 31 of FIG. 30.

FIG. 32 is an embodiment of a hydraulic transfer sleeve of FIGS. 30 & 31.

FIG. 33 is an embodiment of the manifold block of FIGS. 30 & 31.

ELEMENTS AND NUMBERING USED IN THE DRAWINGS AND DESCRIPTION

Figure 1:
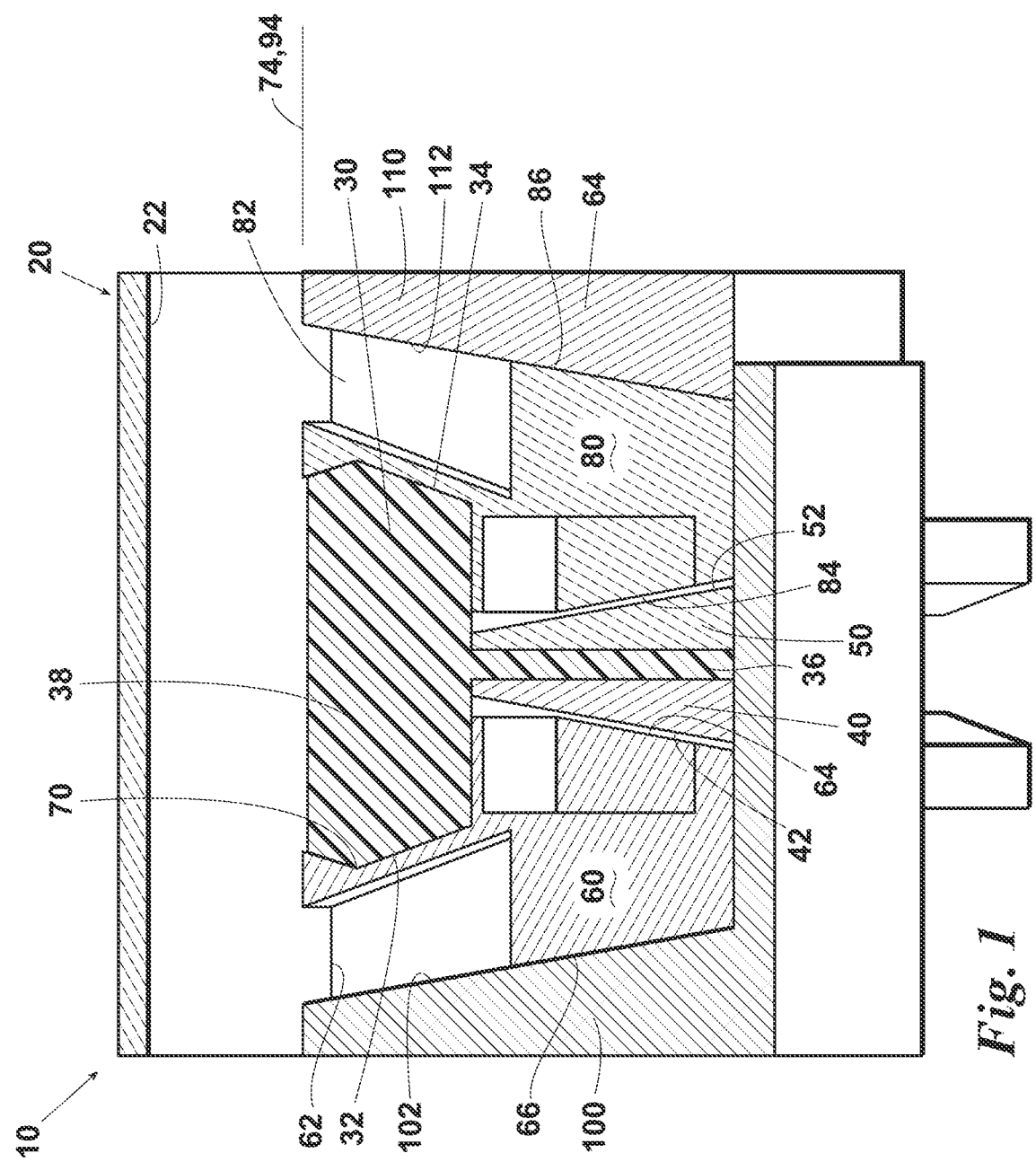
FIG. 1 is a schematic cross-section of a large-gap seal of this disclosure.

| | |
|---|---|
| 10 | Pipeline isolation tool |
| 20 | Pipe |
| 22 | Pipe wall |
| 30 | Seal |
| 32 | First side |
| 34 | Second side |
| 36 | Lower seal profile |
| 37 | Lower end |
| 38 | Upper seal profile |
| 40 | Pressure head |
| 41 | Inner surface |
| 42 | Outer surface |
| 43 | Angled surface |
| 44 | Upper end |
| 45 | Lower end |
| 47 | Recess |
| 50 | Pressure head |
| 51 | Inner surface |
| 52 | Outer surface |
| 53 | Angled surface |
| 54 | Upper end |
| 55 | Lower end |
| 56 | Axially oriented surface |
| 57 | Recess |
| 58 | Lower face surface |
| 59 | O-ring |
| 60 | Structural elements |
| 62 | Upper end |
| 64 | Inner face |
| 66 | Outer face |
| 68 | Overlap |
| 70 | Concave area |
| 72 | Second outer diameter |
| 74 | First outer diameter |
| 80 | Structural elements |
| 82 | Upper end |
| 84 | Inner face |
| 86 | Outer face |
| 88 | Overlap |
| 90 | Concave area |
| 92 | First outer diameter |
| 94 | Second outer diameter |
| 100 | Angle plate |
| 102 | Inner angle surface |
| 110 | Angle plate |
| 112 | Inner angle surface |
| 114 | Face surface |
| 210 | First plugging head |
| 212 | Carrier |
| 214 | Yoke |
| 216 | Yoke pin |
| 218 | Nose |
| 220 | Second plugging head |
| 222 | Upper end |
| 230 | Control bar |
| 231 | Lower end |
| 232 | Transfer sleeve |
| 234 | Ports |
| 236 | Manifold |
| 238 | Yoke |
| 240 | Yoke pin |
| 242 | Bumpers |
| 250 | Sweep |
| 260 | Arm |
| 262 | Bumper |
| 264 | Distal end |
| 266 | Linkage |
| 268 | Proximal end |
| 270 | End |
| 272 | End |
| 276 | Cam surface |
| 278 | Cam |
| 290 | Transfer pin |
| 292 | Passageway |
| 294 | Threaded length |
| 296 | Hex-shaped head |
| 298 | O-ring groove/O-ring |
| 300 | Anti-rotation pin |
| 302 | Spring |
| 304 | Stem |
| 306 | Piston |
| 308 | Hydraulic cylinder |
| 310 | Deactivation volume |
| 312 | Activation volume |
| 314 | Trapezoidal threads |
| 320 | Gripping means |

DETAILED DESCRIPTION

Referring now to the drawing figures, embodiments of a pipeline isolation tool 10 are shown and described. Pipeline isolation tool 10 is received in pipe 20. Pipe 20 defines pipe wall 22. Pipeline isolation tool 10 includes circumferential seal 30. Circumferential seal 30 has first side 32 and second side 34. Seal 30 is expandable between an unset position and a set position.

Seal 30 is configured to sealable engage pipe wall 22 in the set position. When in the set and unset positions, seal 30 defines a T-shaped cross section defining a radially v oriented lower seal profile 36 and a horizontally oriented upper seal profile 38. In some embodiments, radially oriented lower seal profile 36 is smaller in cross section than axially oriented upper seal profile 38.

For purposes of this disclosure, the radial direction and axial direction are relative to the seal 30. For example, when tool 10 is set in a horizontally oriented pipe, the radial direction is vertical (z-axis) and the axial direction is horizontal (y-axis). When tool 10 is set in a vertically oriented pipe, the radial direction is horizontal (y-axis) and the axial direction is vertical (z-axis).

Circumferential pressure heads 40, 50 are located on each side 32, 34 of the seal 30. First circumferential pressure head 40 is located adjacent first side 32 of radially oriented lower seal profile 36. First circumferential pressure head 40 defines outer surface 42. Second circumferential pressure head 50 is located adjacent second side 34 of radially oriented lower seal profile 36. Second circumferential pressure head 50 defines outer surface 52.

Figure 5:
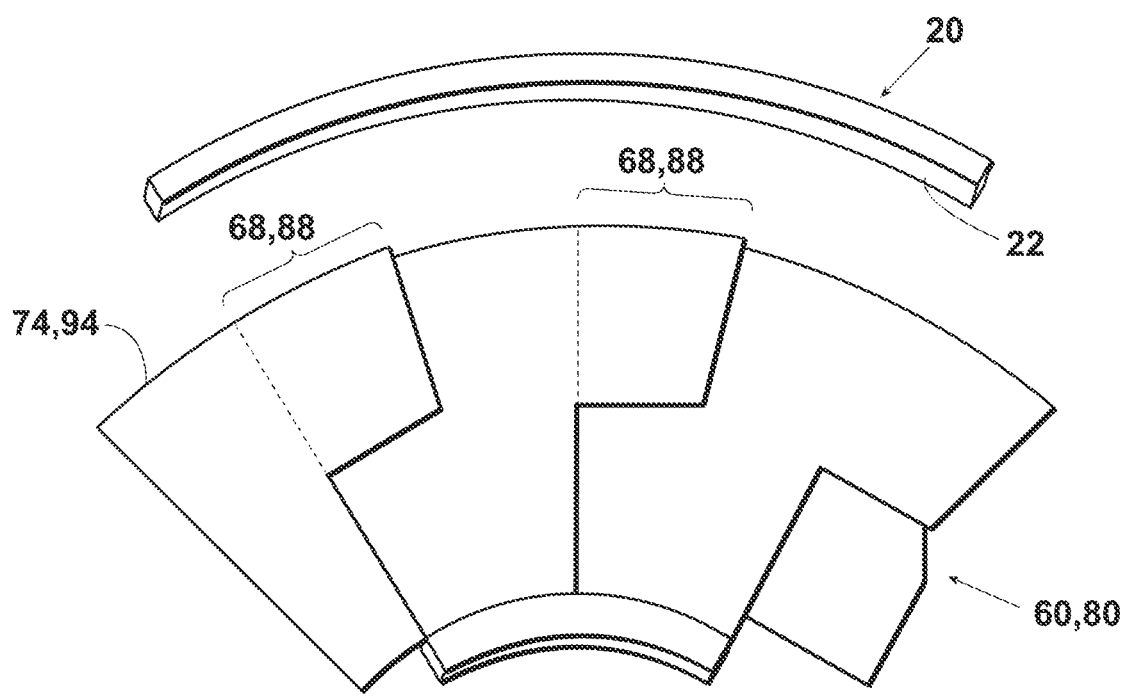
FIG. 5 is a screenshot from an FEA animation showing the structural elements when the seal is in its unset position.

A plurality of first structural) elements 60 are located adjacent first side 32 of seal 30. Each of plurality of first structural elements 60 have an upper end 62, an inner face 64, and an outer face 66. Each of plurality of first structural elements 60 define overlap 68 (see e.g., FIG. 5) with at least a portion of an adjacent first structural element 60. Each of plurality of first structural elements 60 defines concave area 70 proximate to upper end 62 for receiving a portion of axially oriented upper seal profile 38 of seal 30. Inner face 64 of plurality of first structural elements 60 contacts outer surface 42 of first circumferential pressure head 40.

Figure 2:
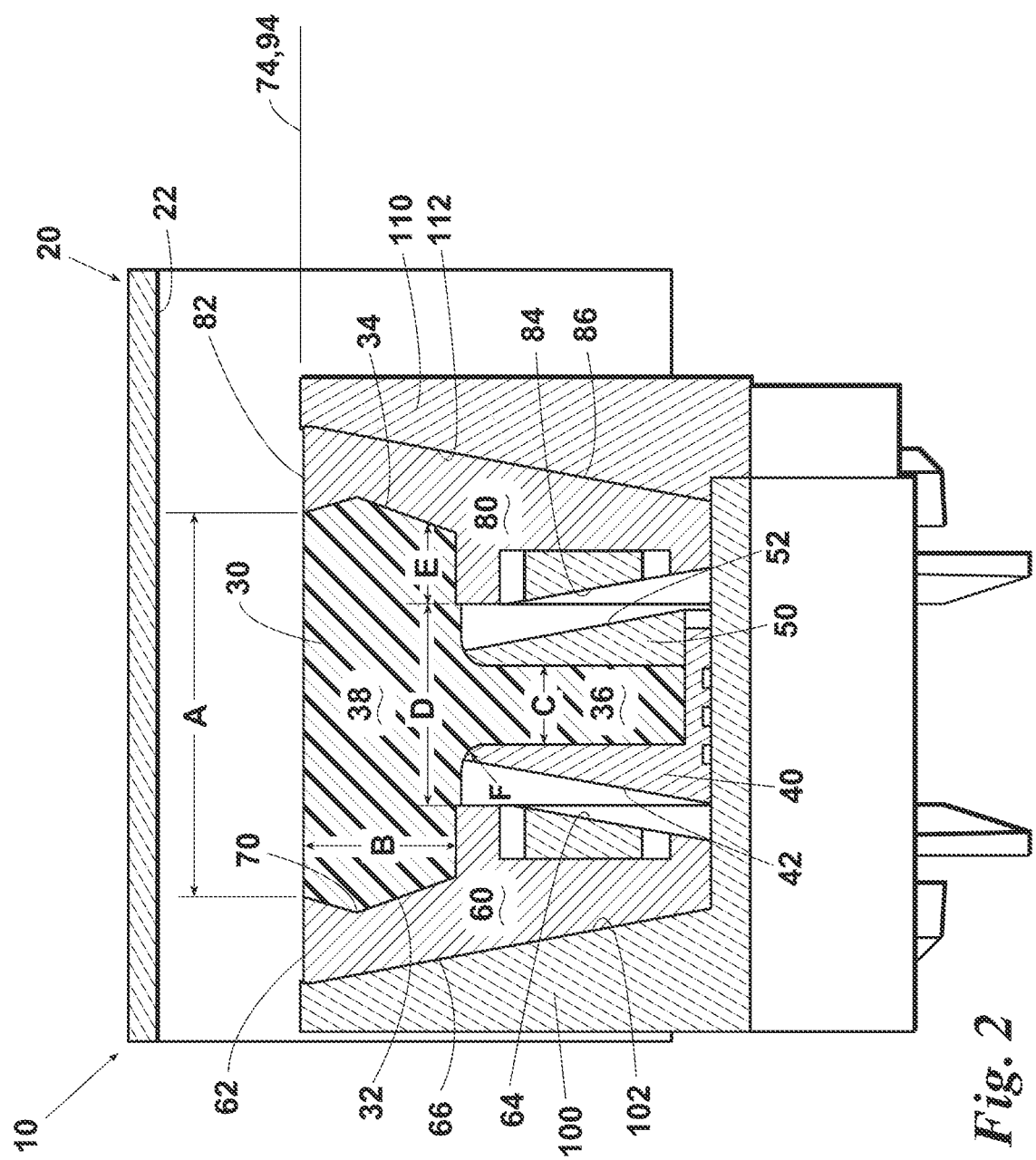
FIG. 2 is a schematic cross-section of the seal illustrating key dimensions.
Figure 3A:
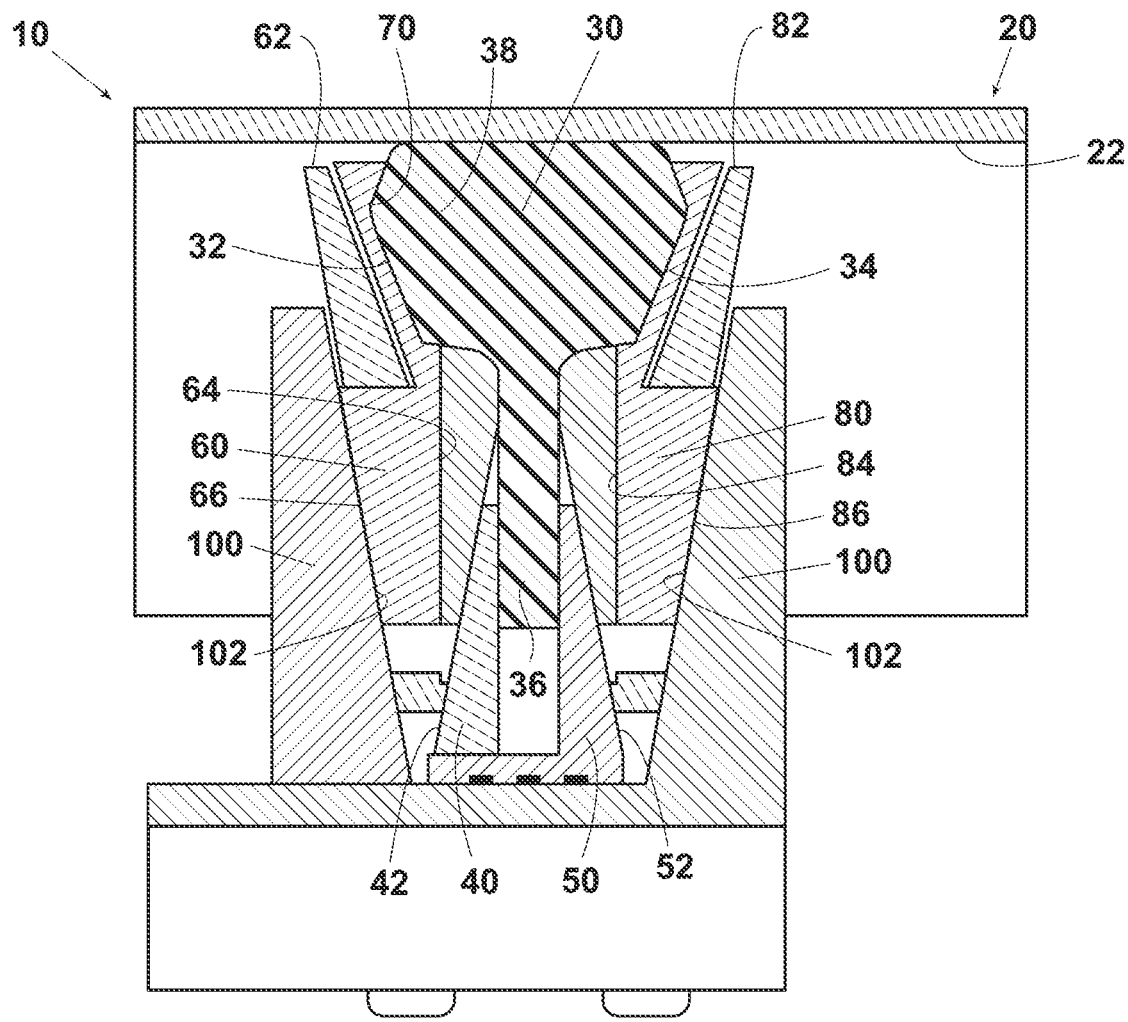
FIG. 3A shows equivalent strain at activation. This linear FEA is sufficient for a qualitative assessment of embodiments of this disclosure. The strain field is uniform across the cross-section and reaches up to 50% (hoop component of the strain is dominant). The maximum reported strains are located at the boundary between the structural (interlocking) segments, however, because of non-optimized geometry these values can be disregarded for other embodiments. A plurality of O-rings provide sealing between an axially oriented surface of the pressure head and the guide.

An amount of overlap 68 of adjacent ones of plurality of first structural elements 60 decreases as seal 30 moves from the unset position (see e.g., FIGS. 1, 2, 4) to the set position (see e.g., FIG. 3A). An amount of overlap 68 of adjacent ones of plurality of first structural elements 60 increases as seal 30 moves from the set position (minimum or lesser overlap) to the unset position (maximum or greater overlap). Therefore, the plurality of first structural elements 60 define an first outer diameter 74 in the unset position (see FIG. 5) and define a second outer diameter 72 in the set position (see FIG. 5). The second outer diameter 72 is greater than the first outer diameter 74.

Figure 6:
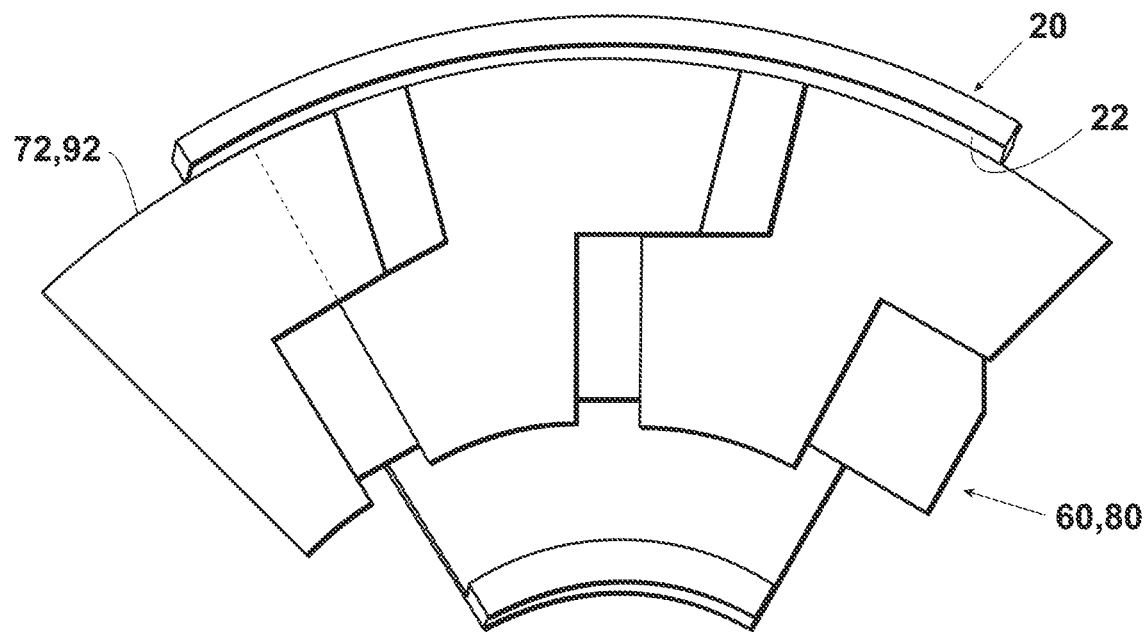
FIG. 6 is a screenshot from an FEA animation showing the structural elements when the seal is in its set position.
Figure 7:
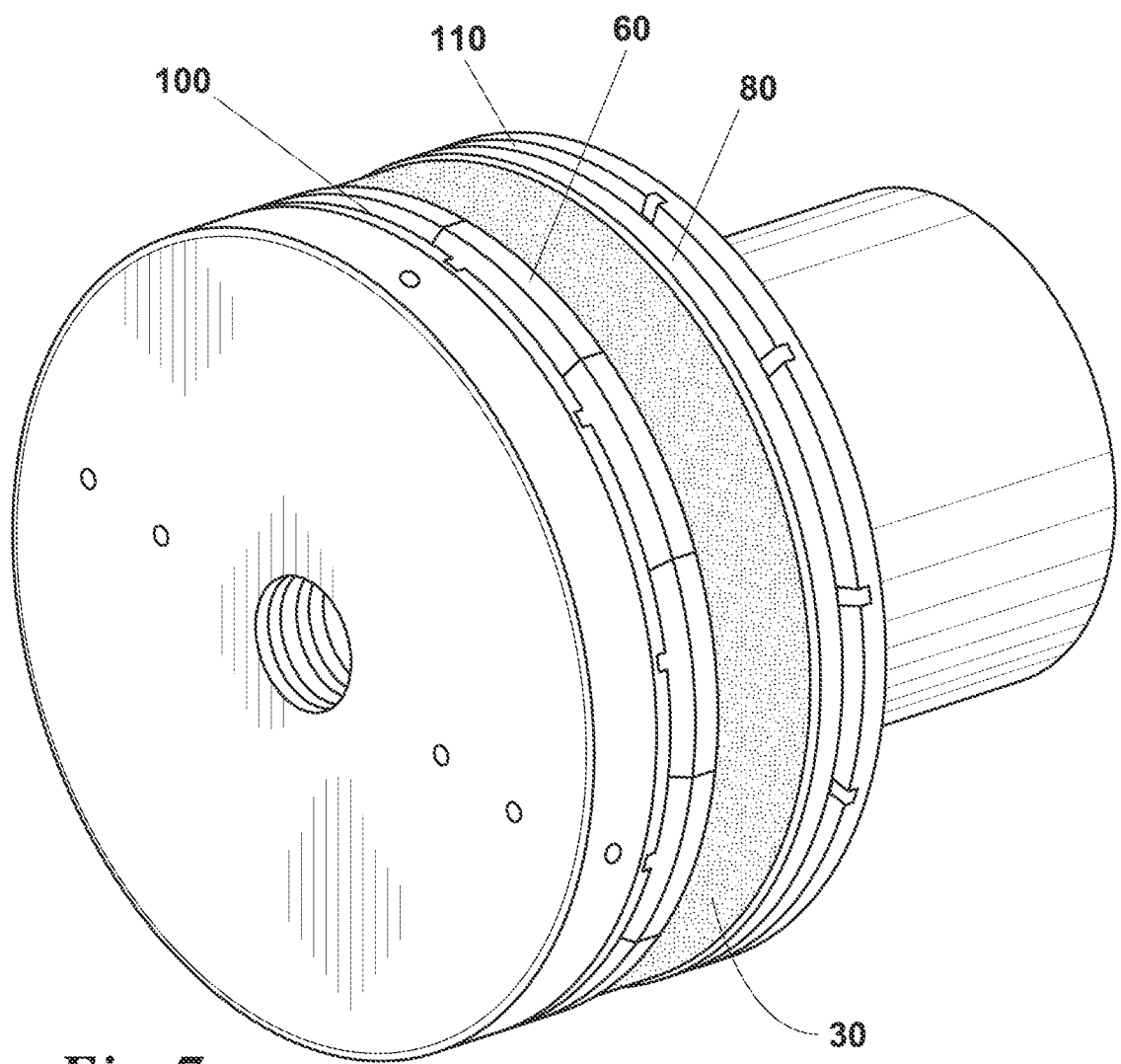
FIG. 7 is an isometric view of a large-gap seal of this disclosure when in a test fixture.
Figure 14:
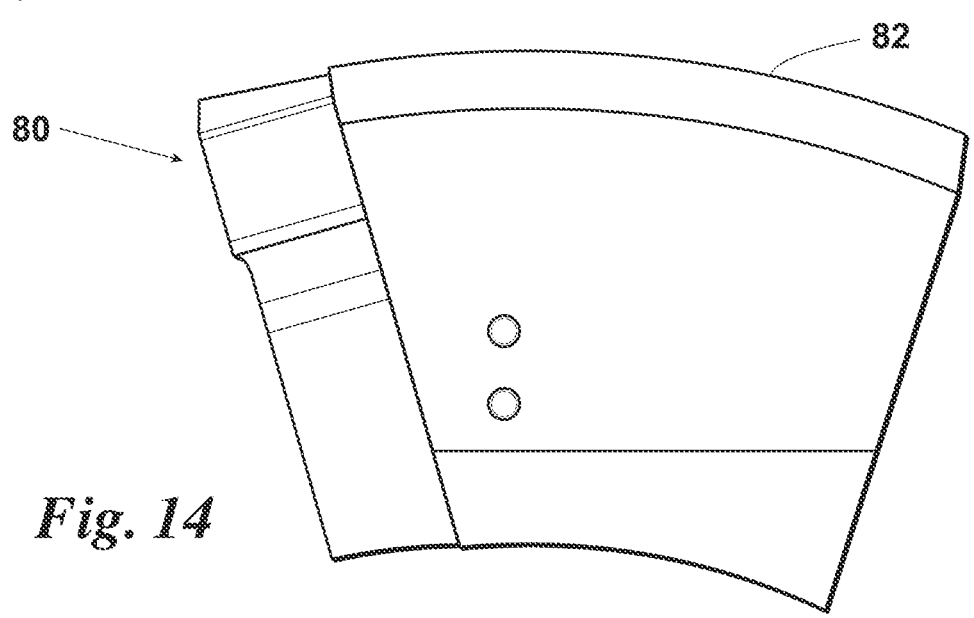
FIG. 14 is a right side elevation view of the element of FIG. 9.
Figure 9:
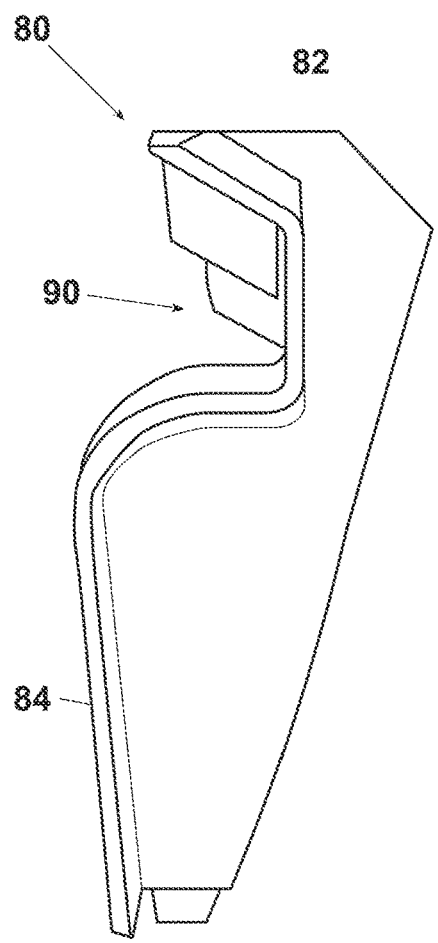
FIG. 9 is a front elevation view of an embodiment of a structural element of this disclosure.
Figure 10:
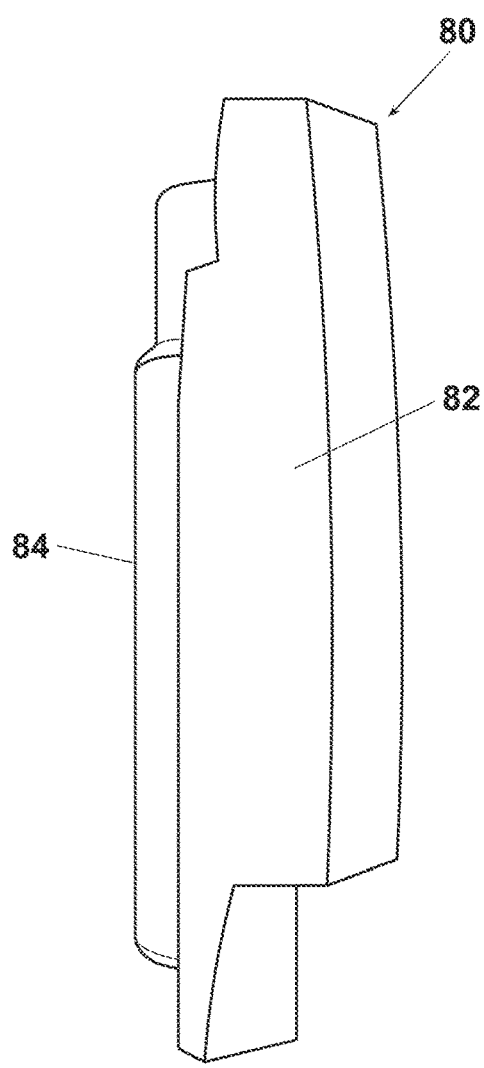
FIG. 10 is a top plan view of the element of FIG. 9.
Figure 11:
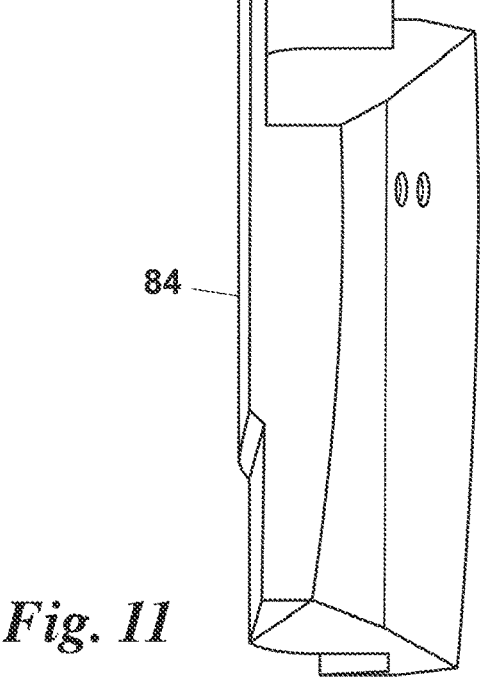
FIG. 11 is a bottom plan view of the element of FIG. 9.
Figure 15:
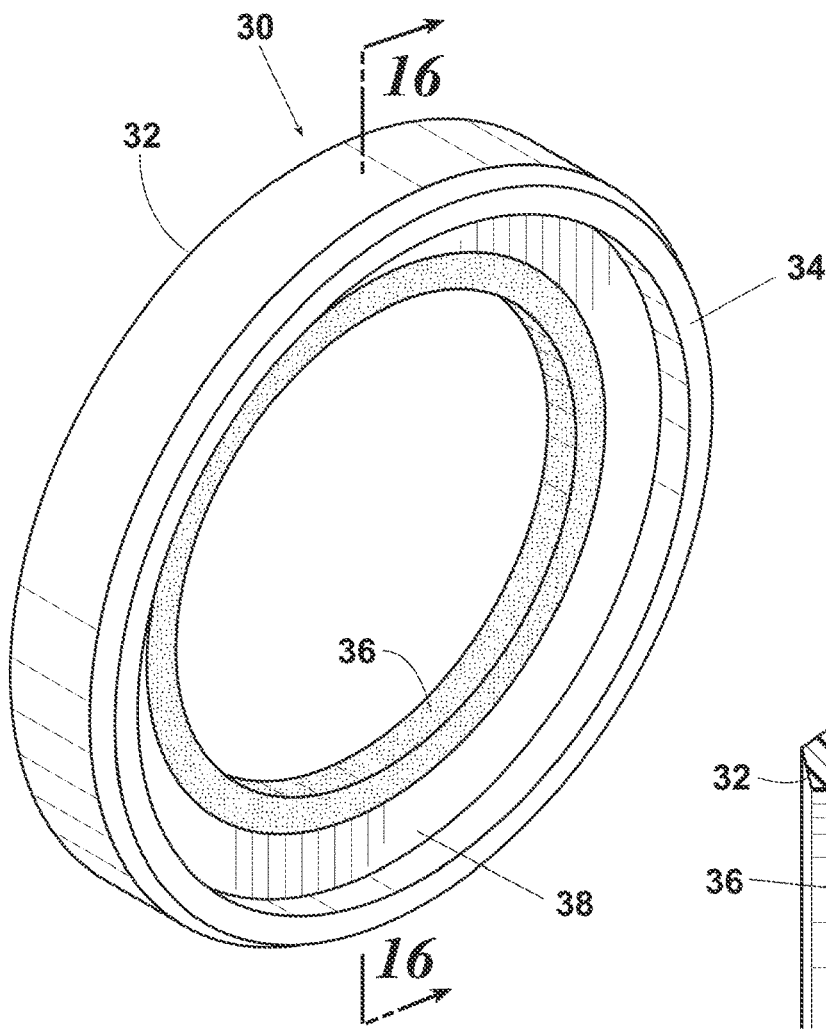
FIG. 15 is an isometric view of an embodiment of a T-bone-shaped seal of this disclosure.
Figure 16:
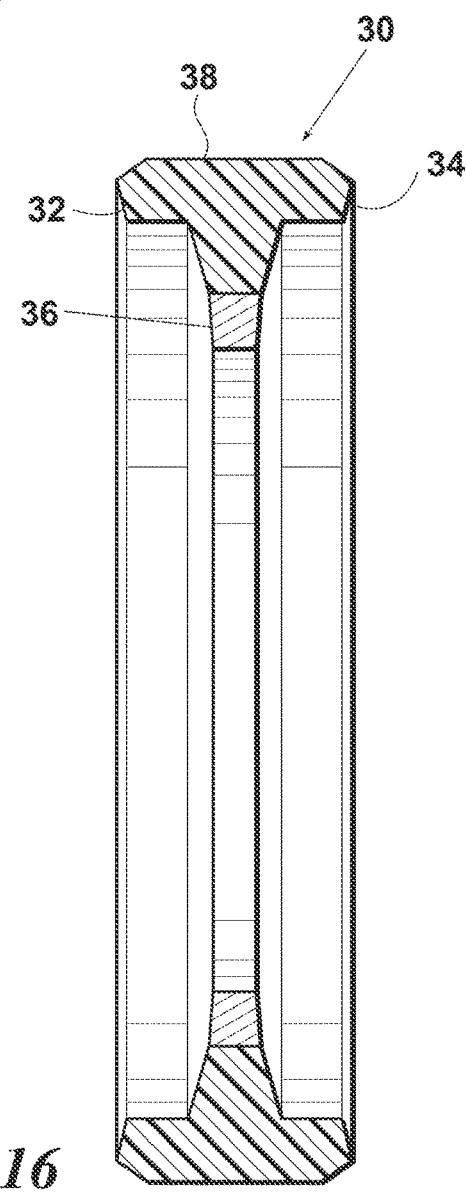
FIG. 16 is a cross-section view of the seal of FIG. 15.
Figure 18:
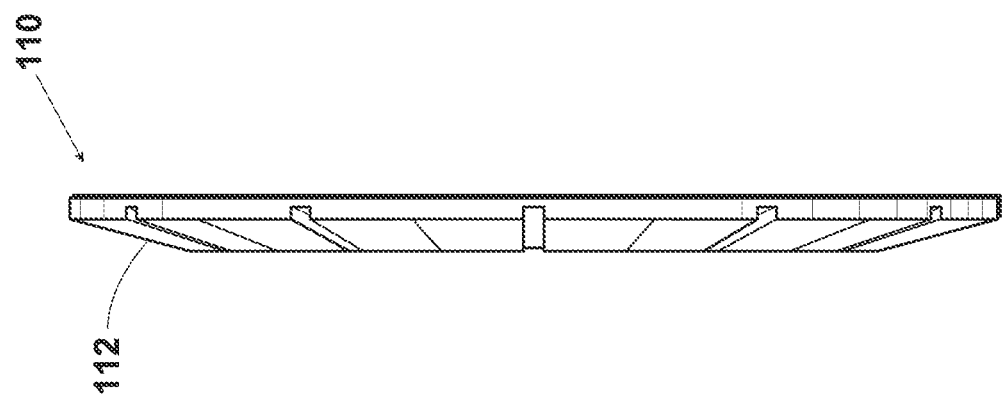
FIG. 18 is a right side elevation view of the plate of FIG. 17.
Figure 17:
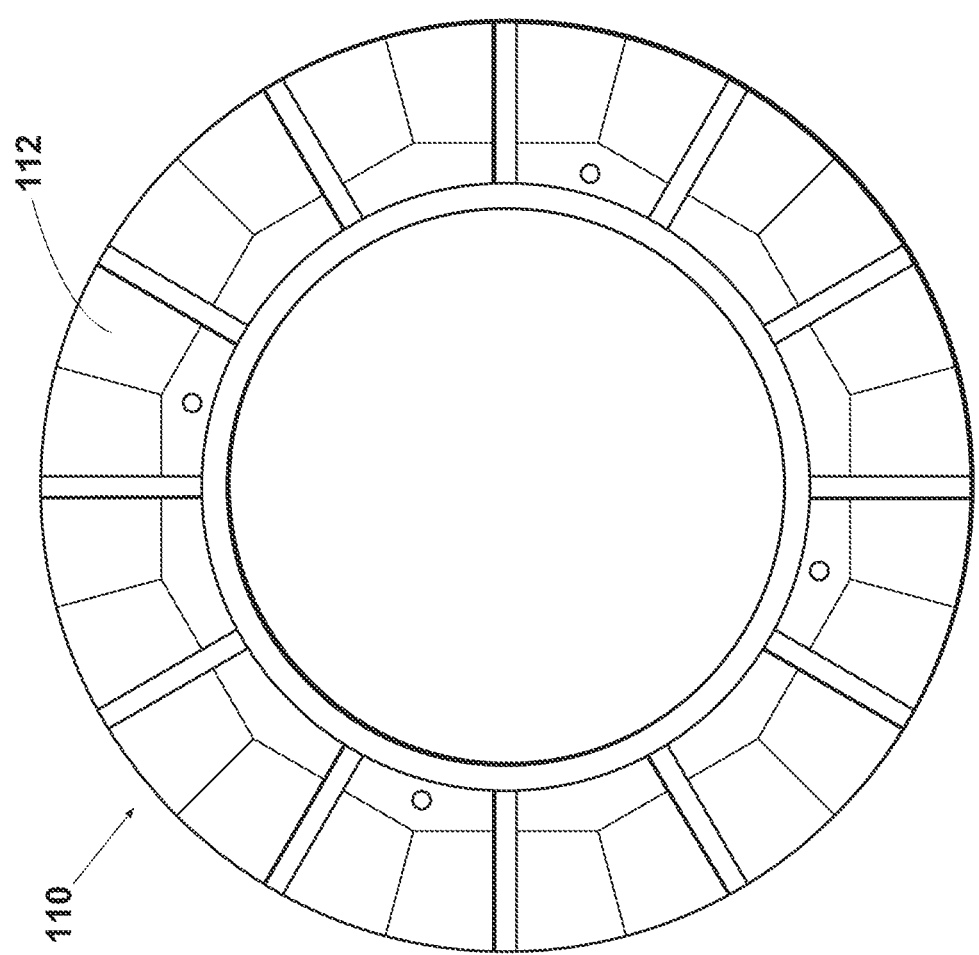
FIG. 17 is a front elevation view of an embodiment of an angle plate of this disclosure. In some embodiments, the plate includes angled surfaces in a range of 10° to 20°, there being subranges and discrete values within this broader range.
Figures 19, 20:
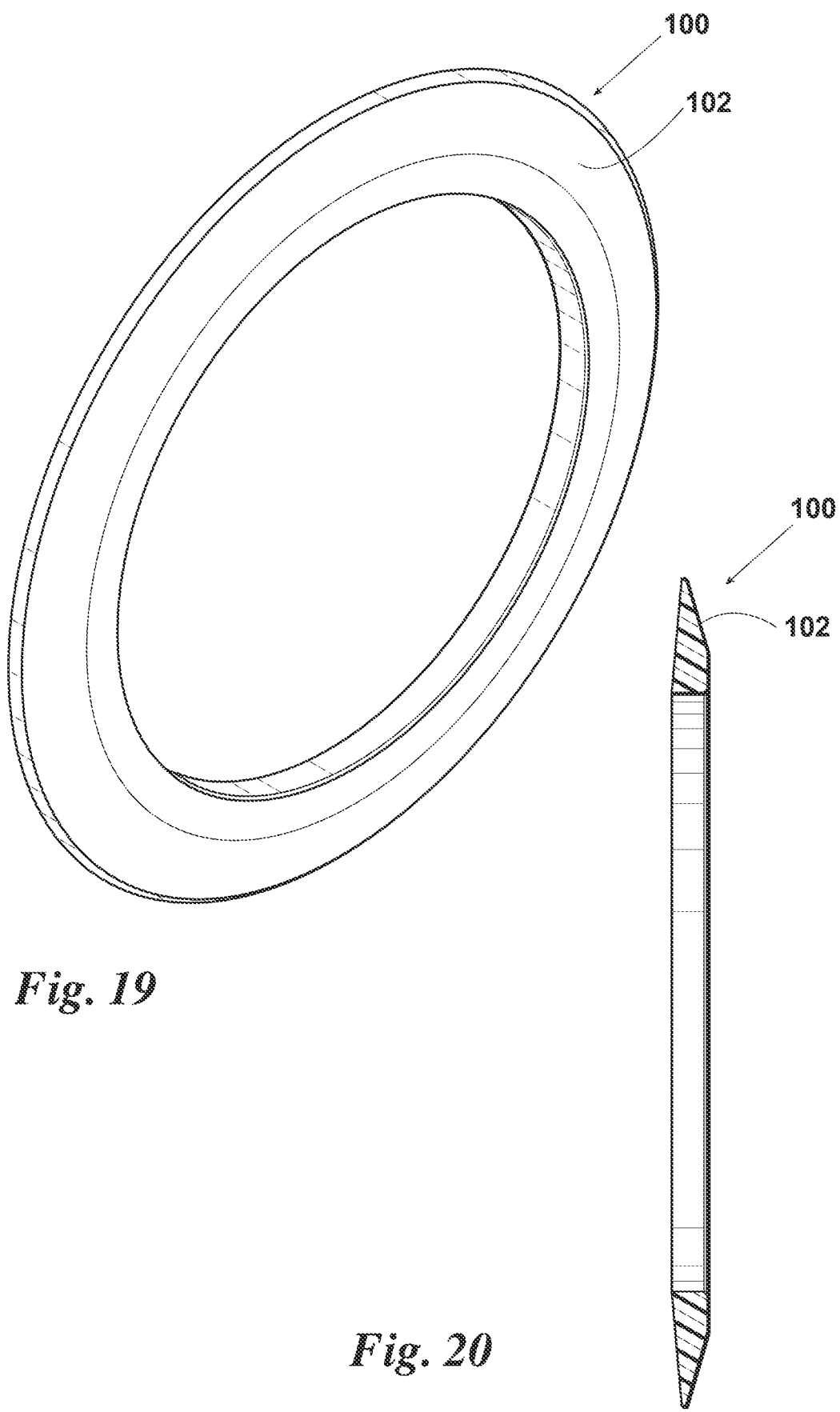
FIG. 19 is an isometric view of an embodiment of a mini pressure head of this disclosure.
FIG. 20 is a cross-section view of the mini-pressure head of FIG. 19.
Figure 21:
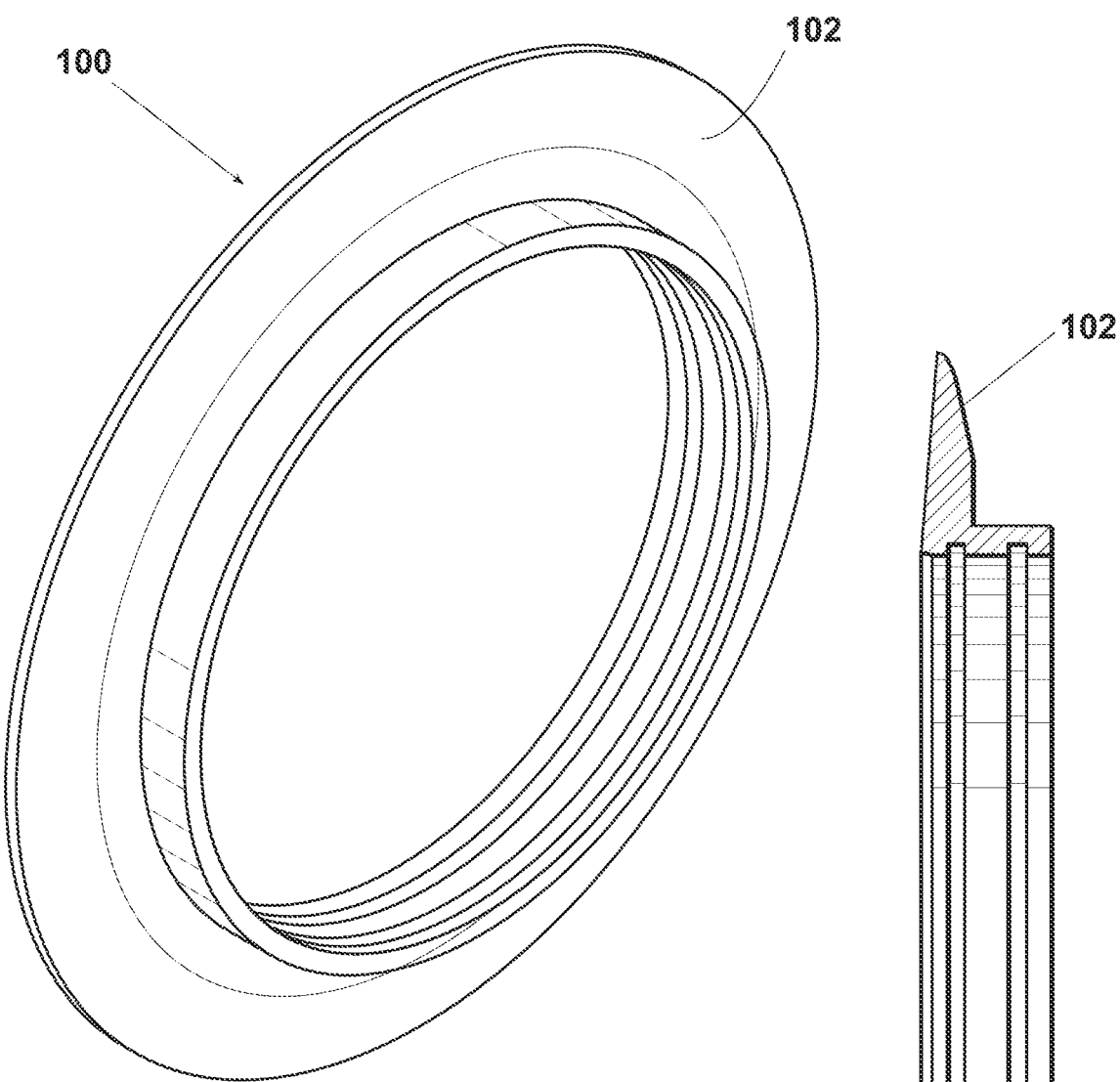
FIG. 21 is an isometric view of an embodiment of a mini pressure head of this disclosure and more suitable for higher pressures than the head of FIG. 19.
Figure 22:
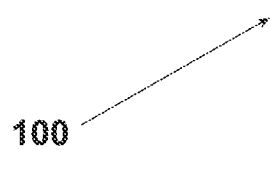
FIG. 22 is a cross-section view of the mini-pressure head of FIG. 21.

A plurality of second structural (interlocking) elements 80 is located on second side 34 of seal 30. Each of the plurality of second structural elements 80 have an upper end 82, an inner face 84, and an outer face 86. Each of the plurality of second structural elements 80 define an overlap 88 (see e.g., FIGS. 5, 6 & 13) with at least a portion of an adjacent second structural element 80. Each of the plurality of second structural elements 80 define a concave area 90 proximate to upper end 82 for receiving a portion of axially oriented upper seal profile 38 of seal 30. Inner face 84 of the plurality of second structural elements 80 contact outer surface 52 of second circumferential pressure head 50.

An amount of overlap 88 of adjacent ones of the plurality of second structural elements 80 decrease as seal 30 moves from the unset position to the set position. An amount of overlap 88 of adjacent ones of the plurality of second structural elements 80 increases as seal 30 moves from the set position (minimum or lesser overlap) to the unset position (maximum or greater overlap). Therefore, the plurality of second structural elements 80 define a first outer diameter 92 (see e.g., FIGS. 3A, 6) in the set position and define a second outer diameter 94 (see e.g., FIGS. 1, 2, 4, 5) in the unset position. The second outer diameter 94 is greater than the first outer diameter 92.

The first and second structural elements 60, 80 engage with respective circumferential angle plates 100, 110. First circumferential angle plate 100 defines an inner angle surface 102. Inner angle surface 102 is in contact with outer face 66 of each of the plurality of first structural elements 60. Second circumferential angle plate 110 defines inner angle surface 112. Inner angle surface 112 is in contact with outer face 86 of each of the plurality of second structural elements 80. The angle plates 100, 110 function as pressure heads, applying pressure to the structural elements as well as the mini-pressure heads 40, 50.

The plates 100, 110 may span the radial distance from the lower end 45, 55 of the pressure heads 40, 50 to an upper end 62, 82 of the structural elements 60, 80 (and therefore are larger size pressure heads than the pressure heads 40, 50). In embodiments, the plates 100, 110 are not mirror images of another, nor are the pressure heads 40, 50.

Embodiments of disclosure further include a "T-bone" or T-shaped" seal 30 in cross-section, see FIGS. 1, 3, 4A, & 15-16. the sealing element 30 having an upper profile 38 and a lower profile 36, the lower profile 36. The two profiles 36, 38 may be different in shape from one another. In some embodiments, the lower profile 36 is narrower in cross-section than the upper-profile 38. A circumferential pressure head 40, 50 is located on each side of, and in contact with, the lower profile 36 of the sealing element 30. A plurality of structural elements 60, 80 are arranged about the pressure heads 40, 50, each structural element 60, 80 overlapping at least a portion of an adjacent structural element 60, 80.

In embodiments, the pair of circumferential angle plates 100, 110 and pair of circumferential pressure heads 40, 50 may be arranged such that, as the circumferential seal 30 moves from the unset position to the set position, the pair of circumferential angle plates 100, 110 apply pressure to the plurality of structural elements 60, 80 prior to the pair of circumferential pressure heads 40, 50 applying pressure to the radially oriented lower profile 36.

The structural elements 60, 80 include a concavity 70, 90 at an upper end 62, 82, into which a portion of the upper profile 38 of the sealing element 30 resides, and an inner face surface 64, 84 in contact with an outer surface 42, 52 of the pressure head 40, 50. The amount of overlap 68, 88 between the adjacent structural elements 60, 80 decrease as the sealing element 30 moves from an unset to a set position, the amount of overlap 68, 88 increasing as the sealing element 30 moves from the set to the unset position. Because the amount of overlap 68, 88 increases and decreases, the structural elements 60, 80 expand between a first size and a second size. A circumferential angle plate 100, 110 includes an inner angled surface 102, 112 that contacts an outer face surface 66, 86 of the structural element 60, 80.

The radially oriented lower seal profile 36 may be smaller in cross-section than the axially oriented upper profile 38 of the seal 30. However, the smaller cross-section is not important for the seal 30 to work as intended. The mini pressure heads 40, 50, see FIGS. 19-22, on each side 32, 34 of the lower seal profile 36 act as supporting structures and prevent extrusion of the seal ID.

In the unset position, the lower profile 36 resides between the mini pressure heads 40, 50, with the upper profile 38 being entirely above upper end 44, 54 of the heads 40, 50. The seal 30 expands towards the pipe 20 in near pure "natural" (hoop) stretch in order to achieve a uniform strain distribution along the entire seal cross-section.

Figure 4A:
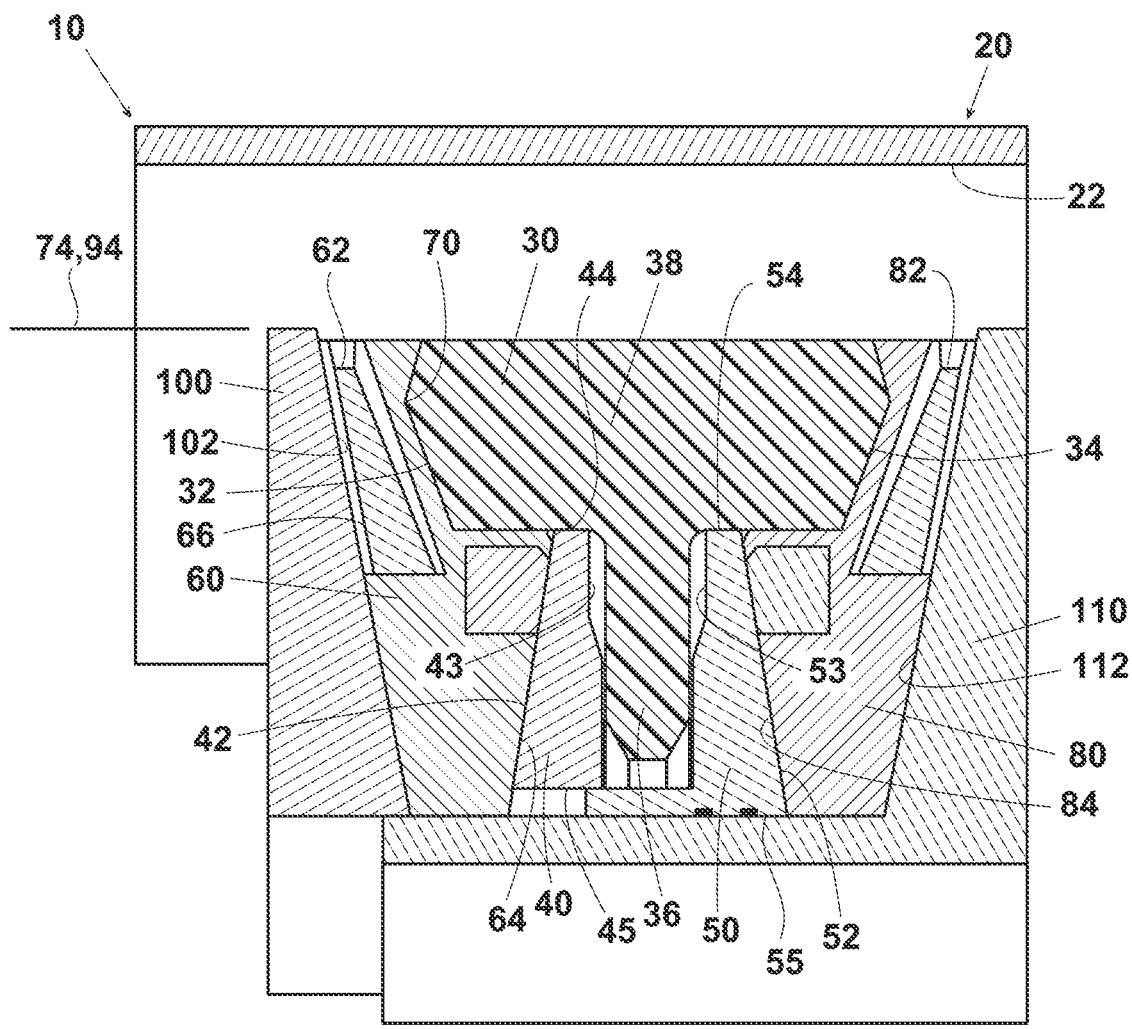
FIG. 4A shows an embodiment of this disclosure that makes use of a mini pressure head to completely prevent extrusion of the seal ID. The seal is shown in its unset position. A pair of O-rings provide sealing between an axially oriented surface of the pressure head and the guide.

Note that in some embodiments the lower end 37 of the seal 30 does not contact an opposing axially oriented surface 56 of the pressure head 50, and the radial distance between the two increases as the seal 30 moves between the unset and set positions (compare FIG. 4A (in unset position) to FIGS. 3A (set position) and 4B (moving to set position)). The lower end 37 is spaced a first radial distance from the axially oriented surface 56 when the circumferential seal 30 is in the unset position and a second radial distance greater than that of the first when the seal 30 is in the set position, the first radial distance being greater than zero. Because of this arrangement, and by way of a non-limiting example, the seal 30 may expand to about 60% to 70% of the radial area available.

As contact with the pipe ID 22 occurs, the mini pressure heads 40, 50 get compressed towards the seal 30 and act across a large cross-section in order to distribute the load from the isolation pressure. See FIGS. 4A & 4B. Unlike the outer surface 42, 52 of the pressure heads 40, 50, which have a constant slope, the inner surface 41, 51 of the pressure heads 40, 50 does not. In some embodiments, the inner surfaces 41, 51 may include a plurality of surfaces 43A-C, 53 A-C oriented at different angles such that a recessed area 47 is formed (thereby providing greater axial distance between the heads 40, 50 at the upper end 44, 54, than at the lower end 45, 55). For example, surface 43A, 53A may be vertical, surface 43B, 53B may then angle toward outer surface 42, 52, and surface 43C, 53C may be vertical or slightly off vertical, angling toward the outer surface 42, 52.

When transitioning to the set position, and when in the set position, a portion of the lower profile 38 may reside within the recess 47—that is, in contact with surfaces 43B-C, 53B-C but not 43A, 53A—with another portion of the lower profile residing entirely above the upper ends 44, 54 of the pressure heads 40, 50. A pair of O-rings 59 located between a lower face surface 58 of pressure head 50 and an opposing face surface 114 of the angle plate 110 provide sealing between pressure head 50 and angle plate 110. The o-rings 59 do not expand.

Referring to FIG. 2, the main dimensions "A" and "B" of T-shaped seal 30, together with distance "D" between the structural segments 60, 80, dictate when contact between the elastomer and steel components get established. In embodiments, the mini pressure heads 40, 50 do not start squeezing the seal 30 immediately but do so later in the activation cycle in order to allow for building a uniform strain field within the seal 30. Dimensions "A", "B" and "C" are predetermined to account for the design expansion gap and can be optimized to accommodate one or more pipe IDs. Note that where two or more pipe IDs are designed for, the seal 30 would have multiple set positions, that is, one for each pipe ID. For example, the circumferential seal 30 can have a first set position and a second set position, the first set position being for a first pipe diameter and second set position being for a second pipe diameter greater than that of the first pipe diameter. Thickness "C" should (in general) be sized to bring the segments 60, 80 together as much as possible and prevent the rubber seal 30 from extruding inward into the cavity between the mini pressure heads 40, 50. Thickness "C" may be smaller than that of "B". In some embodiments, the overall height of the seal 30 (in the radial direction when unset) is less than the radial distance "G" (see e.g. FIGS. 3 to 4B). Distance "E" also helps with the preventing extrusion; making sure the seal 30 has enough support on the segments 60, 80, which will reduce the risk of extruding the seal 30 radially inwards. The pressure heads 40, 50 include a radius "F" at their upper end where the seal 30 transitions between its lower and upper profiles 36, 38.

Figure 3B:
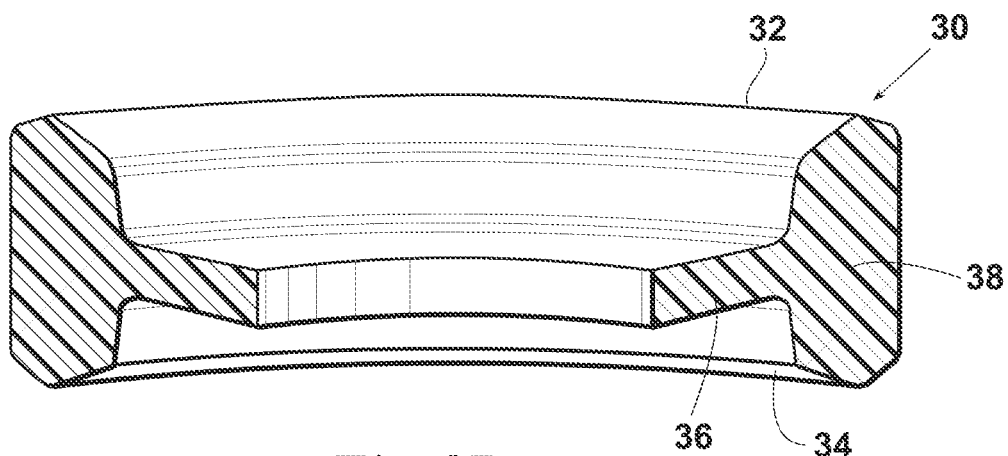
FIG. 3B is a cut-away perspective view of the seal of FIG. 3A.
Figure 4B:
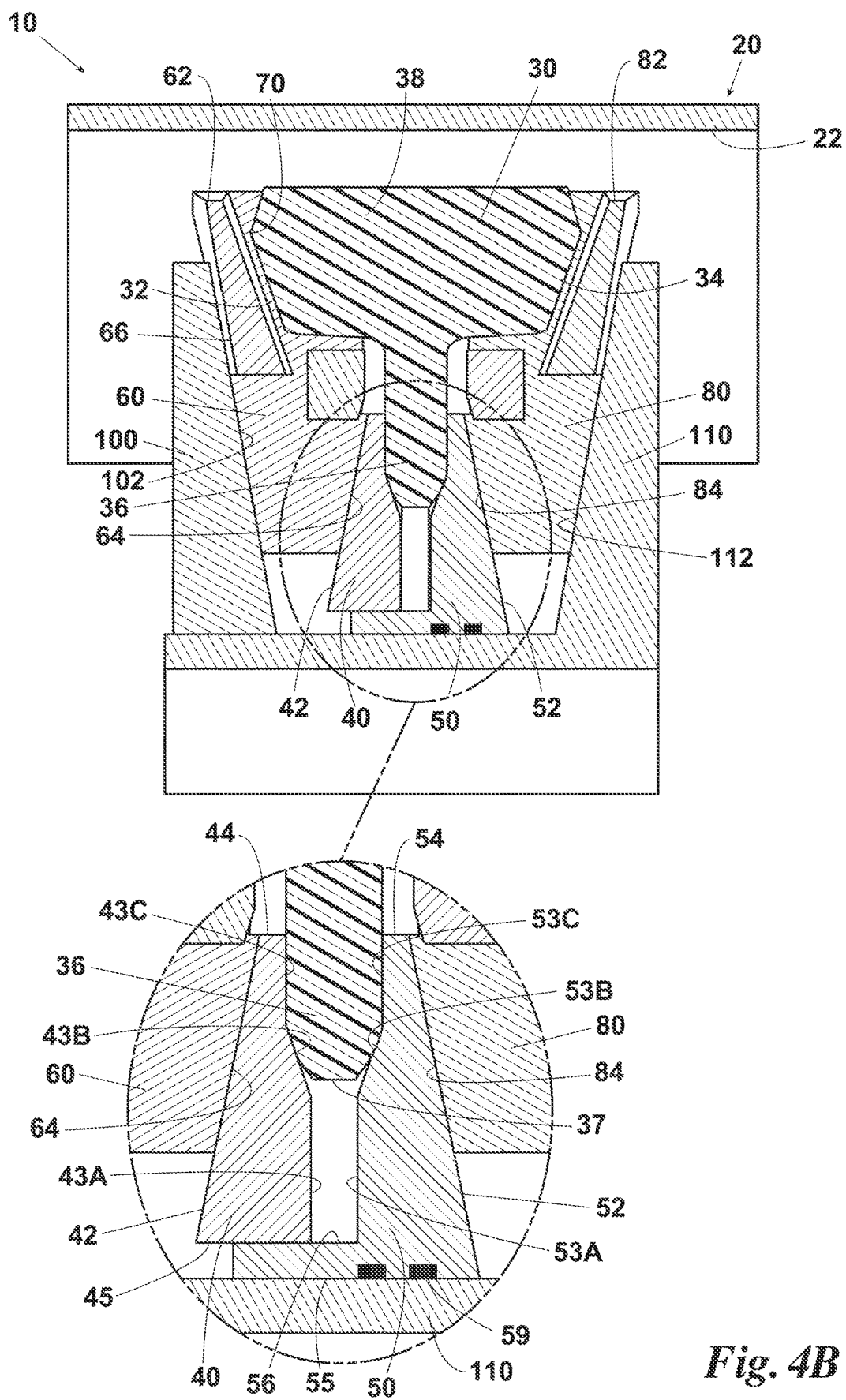
FIG. 4B is the embodiment of FIG. 4A as it transitions to the set position.

ID extrusion of seal 30 at high pressure can be a risk. FIG. 3 shows an embodiment in which the ID extrusion of seal 30 is limited, but possible. Such a design is considered for low pressure applications, and can be optimized as stated above by manipulating dimensions "C", "D" and "E" as well as "G.". FIGS. 4A and 4B shows an embodiment that prevents extrusion of the ID of seal 30 completely. See also FIGS. 21 & 22. The lower profile 36 of the seal 30 does not contact an upper axially oriented surface 51 of pressure head 50. The lower end 37 of the profile 36 may be narrower in cross-section than the middle and upper portions of the profile 36. In some embodiments, the cross-section of toward the lower end 37 is semi-hexagonal in shape. When the seal 30 gets activated, the mini pressure heads 40, 50 squeeze the ID extension of seal 30 and also make contact. This introduces an adjustable reinforcing effect that can be tailored for high-pressure isolations.

Furthermore, a high Shore rubber can be molded to the ID of the seal 30 in order to achieve a hard seal that would prevent radial extrusion (with a lower Shore rubber on the OD of the seal). The contact between the mini pressure heads 40, 50 and the seal 30 can also be designed as a high-friction contact to help minimize this effect. In some embodiments, a higher Shore rubber is used on the upper corners of the seal 30 than in other areas of the seal 30.

Increased stress and jamming of the movable mini pressure heads 40, 50 is another risk that can also be addressed by design features, such as increasing material thickness, ensuring a low friction surface and proper gap tolerance between the mini pressure heads 40, 50, angle features angle plates 100, 110.

A large-gap seal 30 of this disclosure expands radially with low force, remains relatively unstrained from the axial direction during setting, and introduces a reinforcing effect to supporting segments that prevents them from tilting at large expansion gaps. Embodiments of this disclosure expand radially by 20% or more to engage the pipe wall 22 due to the reinforcing effect of segments 60, 80 and no need to extrude the seal 30 radially inwards. The seal 30 is also independent of the isolation pressure magnitude with no ID of seal 30 extrusion. The seal 30 also is highly customizable in that in can be optimized for a variety of expansion gaps and isolation pressures by manipulating angles, thicknesses and heights of the segments 60, 80 and T-bone shaped seal 30.

Figure 23:
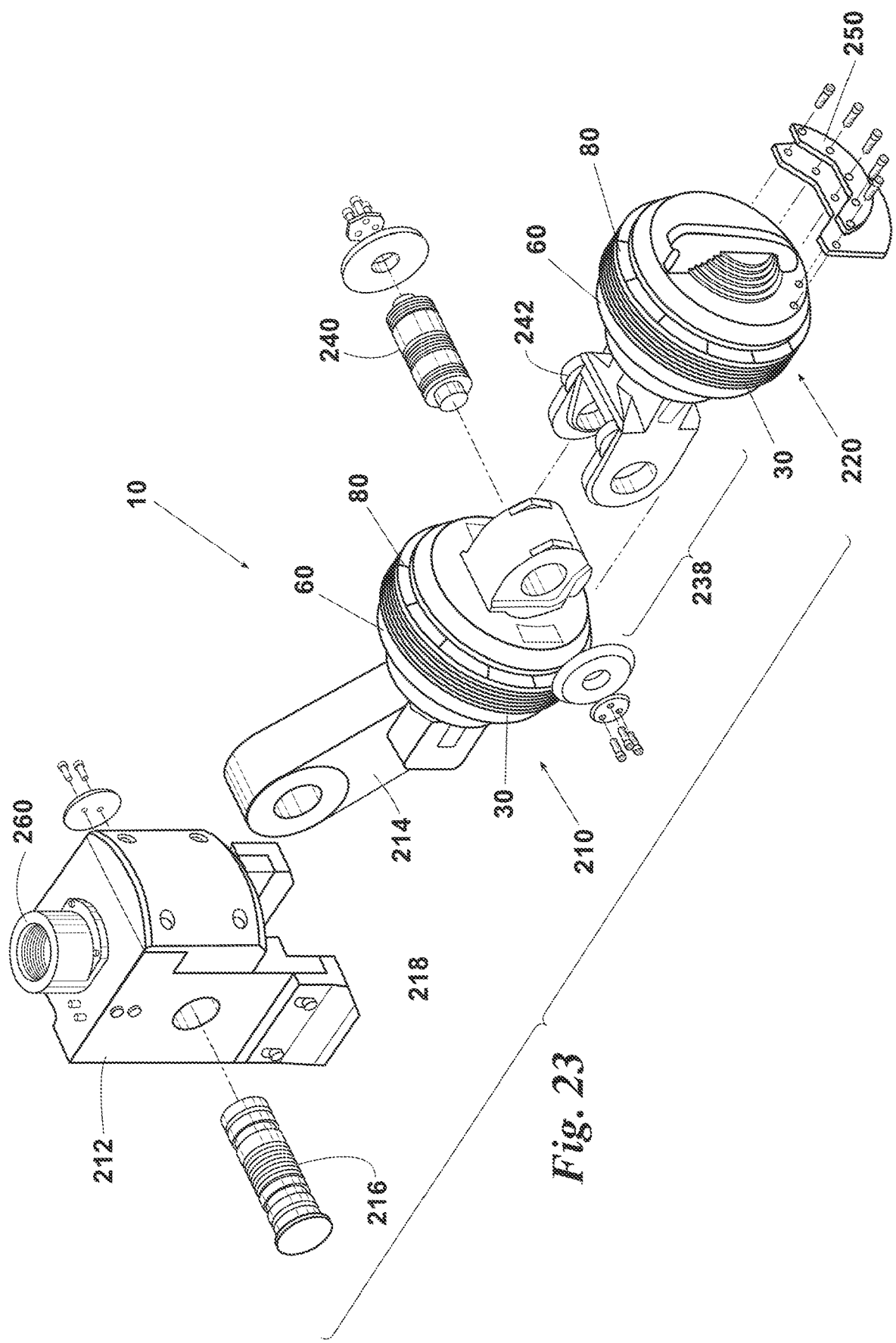
FIG. 23 is an isometric, exploded view of an isolation tool of this disclosure. The tool may include a pair of bumpers on the primary plugging head, the bumpers making contact with a pipe wall (lateral access) cutout when the tool is inserted and retracted into the main pipeline.
Figure 24A:
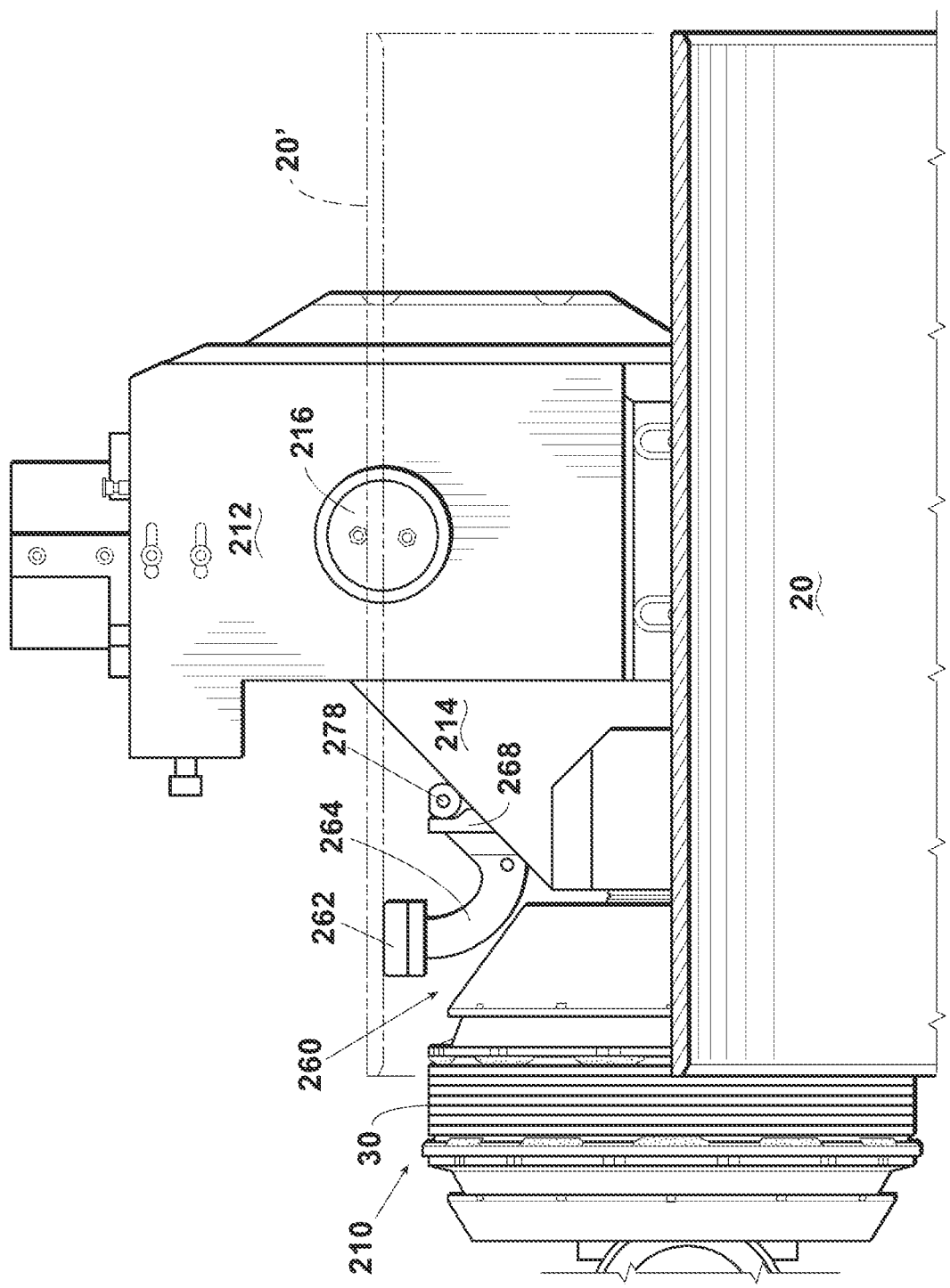
FIG. 24A is an embodiment of an isolation tool of this disclosure including an arm with an arcuate-shaped bumper that makes contact with the ID of the pipe to distribute forces experienced by the tool back into the pipe when sealing against the pipe. Only one plugging head is shown for purpose of illustration. The arm is shown in its set or fully deployed position with the sealing element in its unset position. The arm may be connected to the control bar and moved into position as the tool enters the pipeline or it may be hydraulically actuated. Once in its set position, the sealing element may be deployed.
Figure 24B:
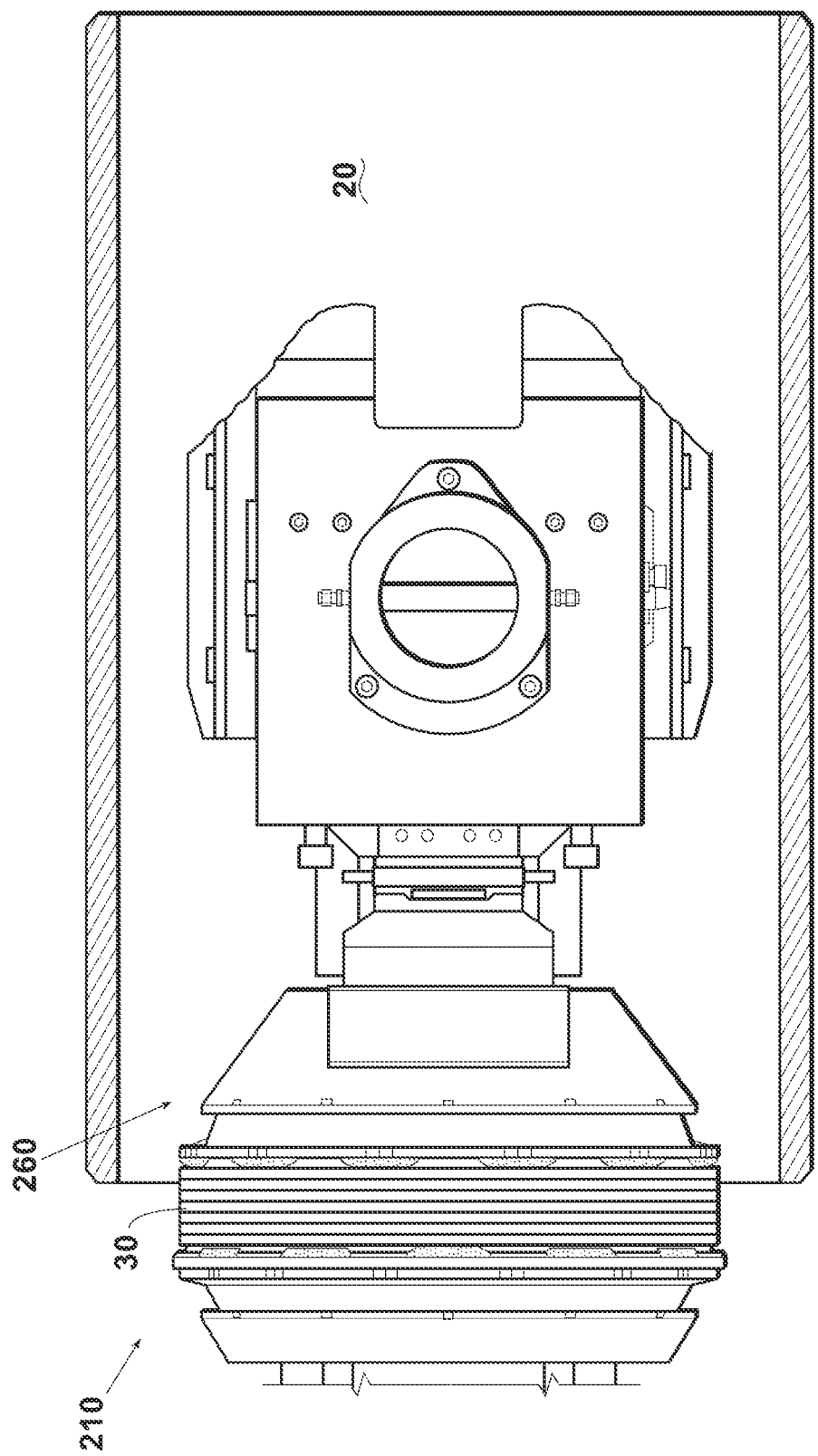
FIG. 24B is a top view of the isolation tool of FIG. 24A.
Figure 25A:
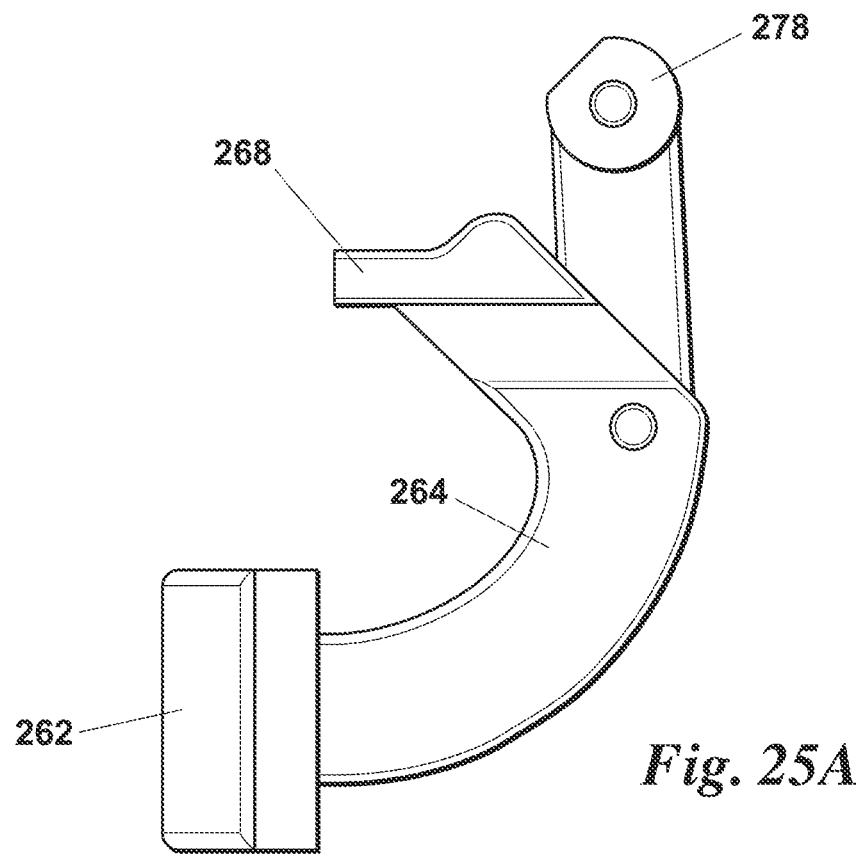
FIG. 25A is side view of the arm of FIG. 24A when in an unset position.
Figure 25B:
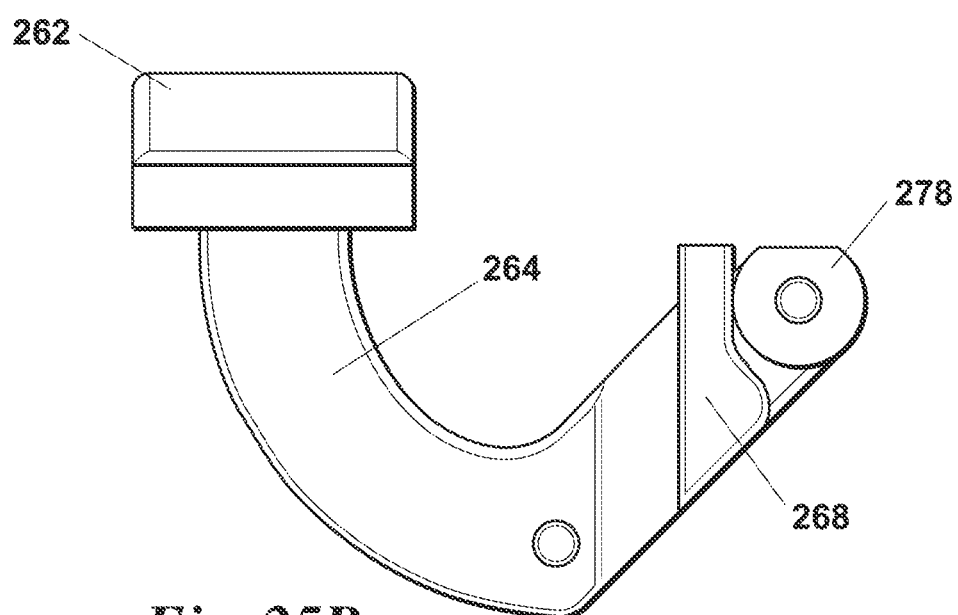
FIG. 25B is a side view of the arm of FIG. 24A when in a set or fully deployed position.
Figure 25C:
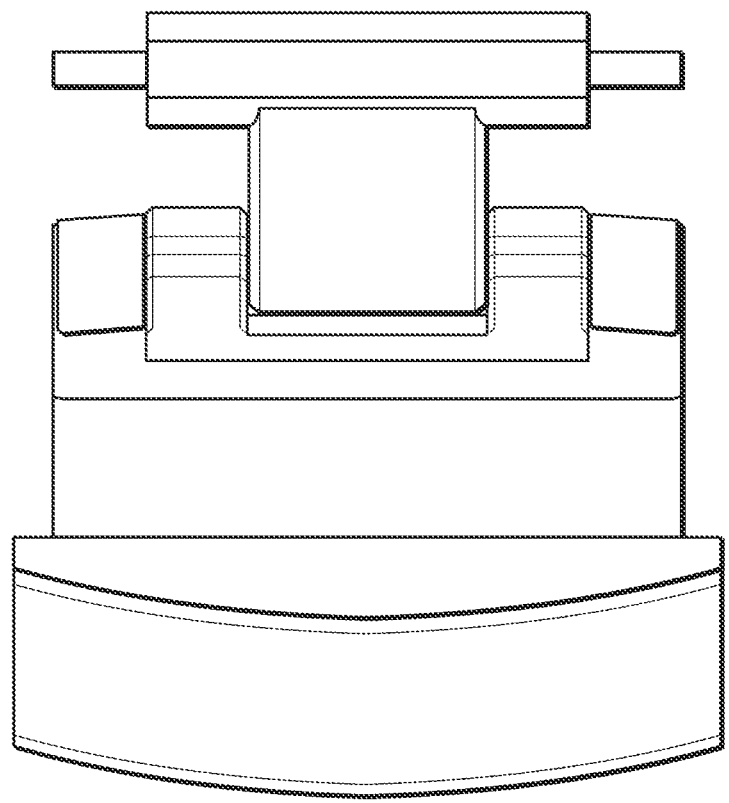
FIG. 25C is a top view of the arm of FIG. 24A (unset position).
Figure 25D:
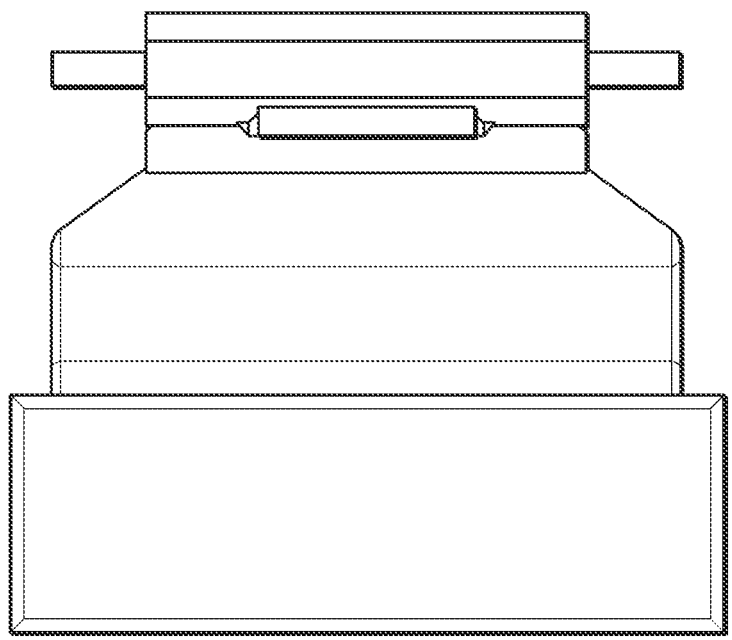
FIG. 25D is a top view of the arm of FIG. 24A (set position).
Figure 26A:
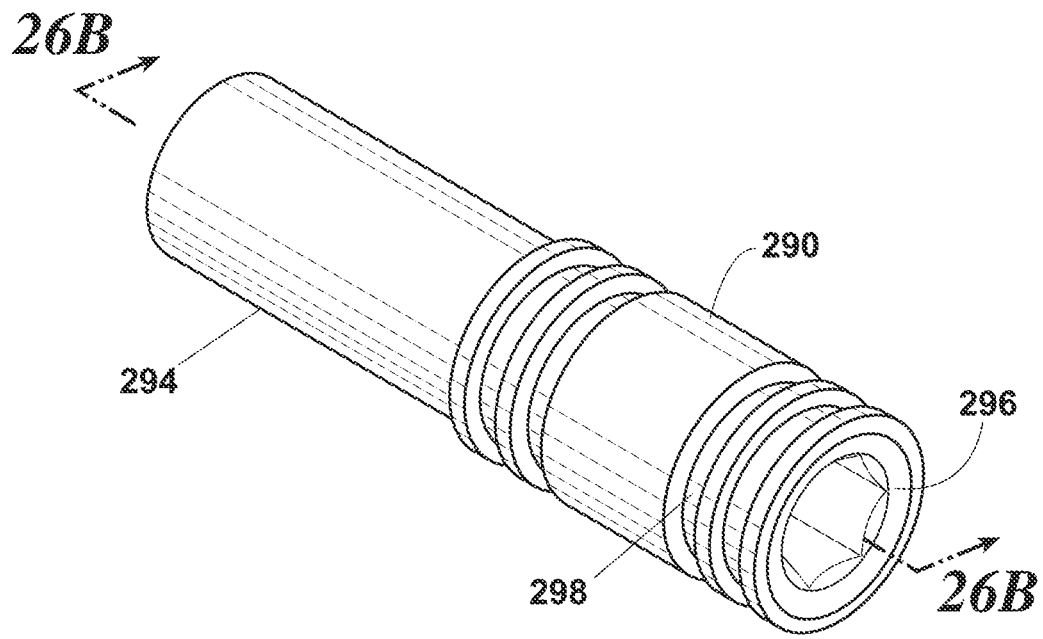
FIG. 26A is an isometric view of an embodiment of a transfer pin of this disclosure. The transfer pin helps continue the fluid circuit between adjacent components like the control bar and yoke or the yoke and plugging head.
Figure 26B:
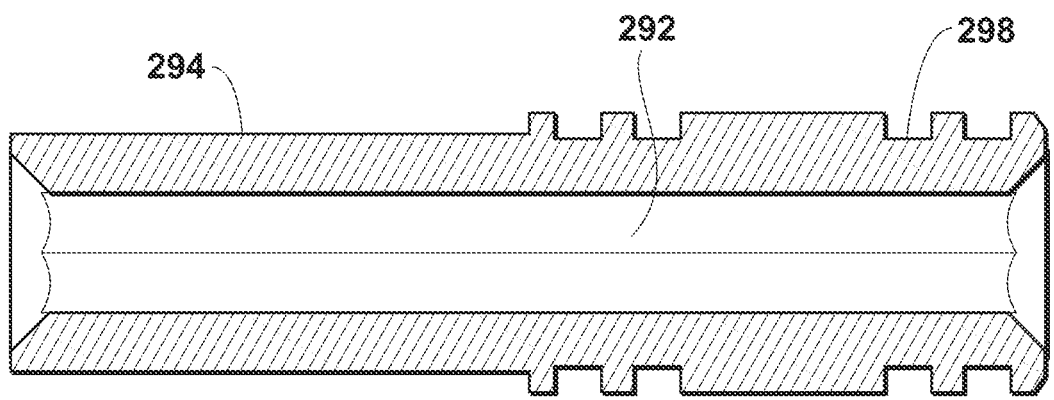
FIG. 26B is a cross-section view of the transfer pin of FIG. 26A. The transfer pin is threaded along the length opposite that of the o-ring grooves.
Figure 27B:
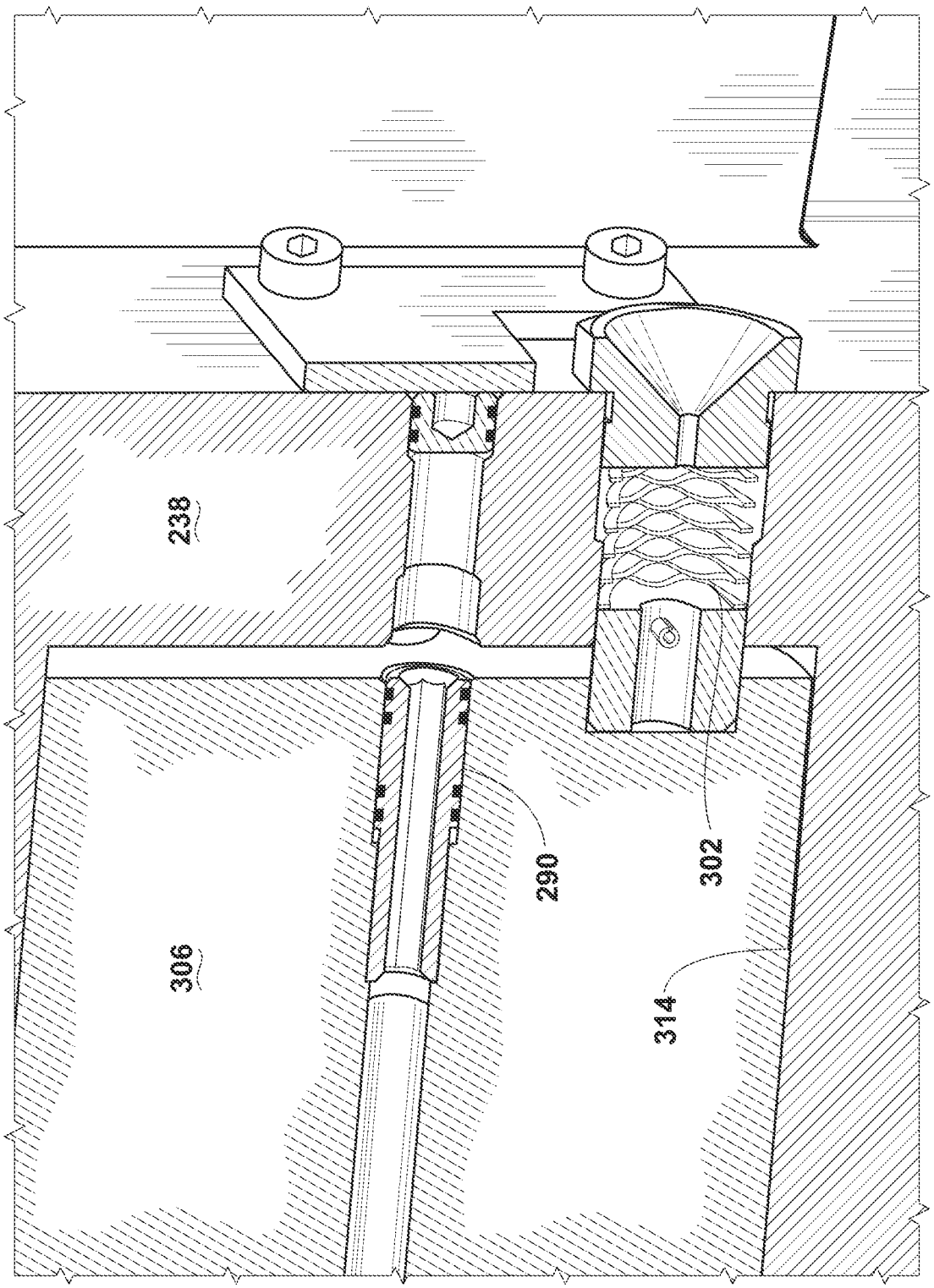
FIG. 27B is a view of the transfer pin and an anti-rotation pin on a lower pressure side of the tool between the secondary hinge and secondary piston.
Figure 28A:
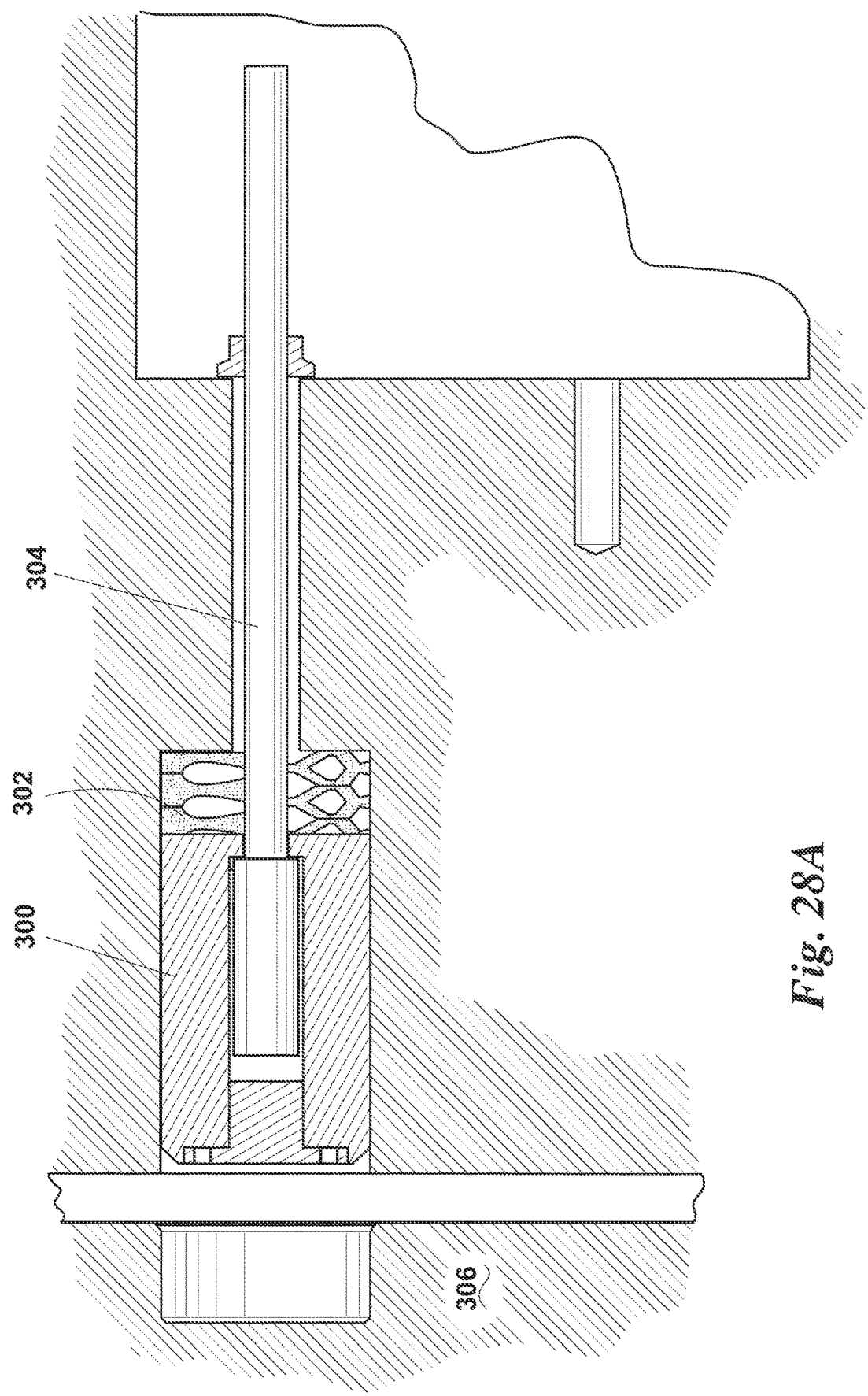
FIG. 28A is cross-section view of an embodiment of a spring-loaded anti-rotation pin of this disclosure located on the higher pressure side, with the stem in a retracted (minimum stroke) position. The spring may be a wave spring.
Figure 28B:
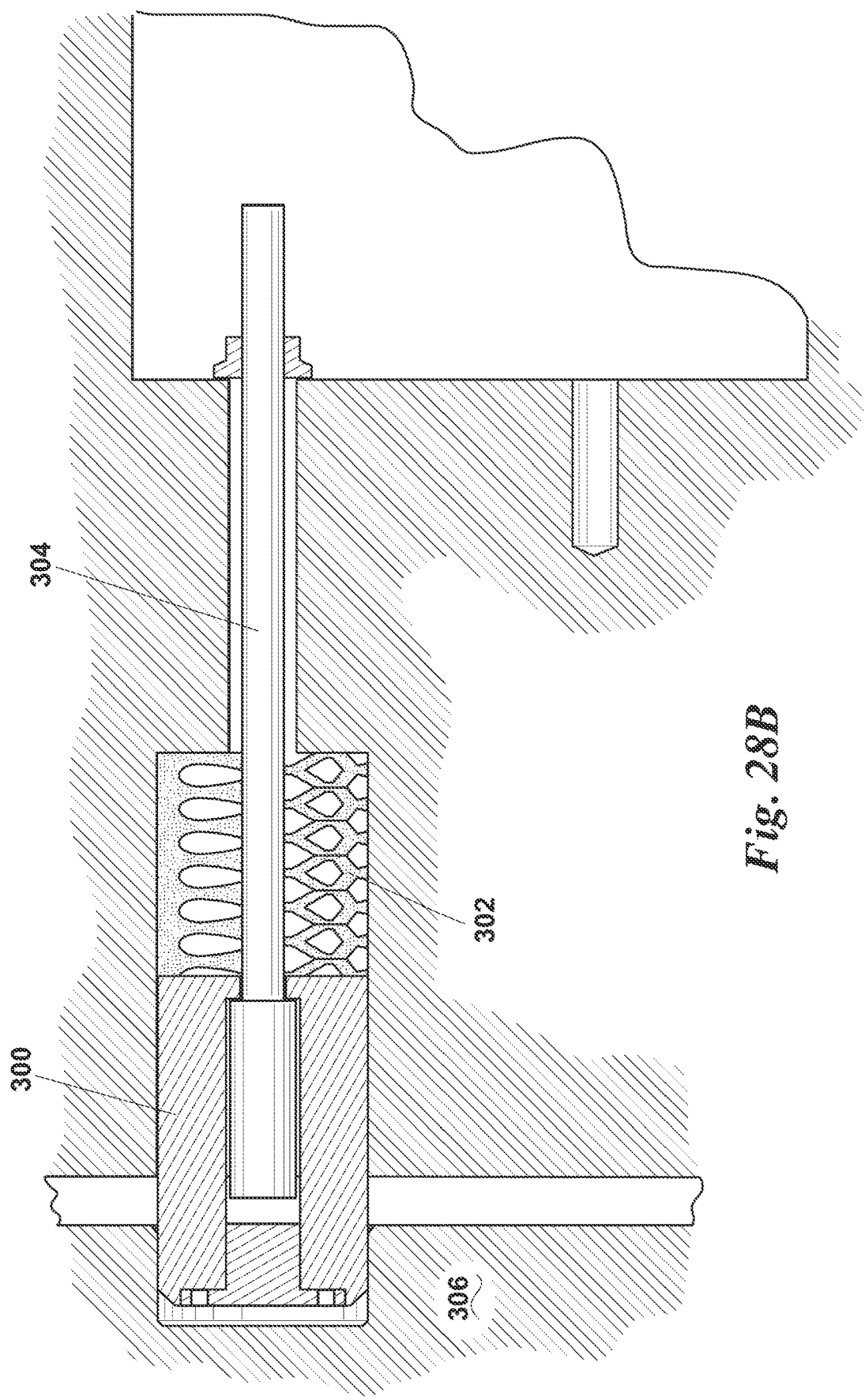
FIG. 28B is cross-section view of the spring-loaded anti-rotation pin of FIG. 28A with the stem in an extended (maximum stroke) position.
Figure 35:
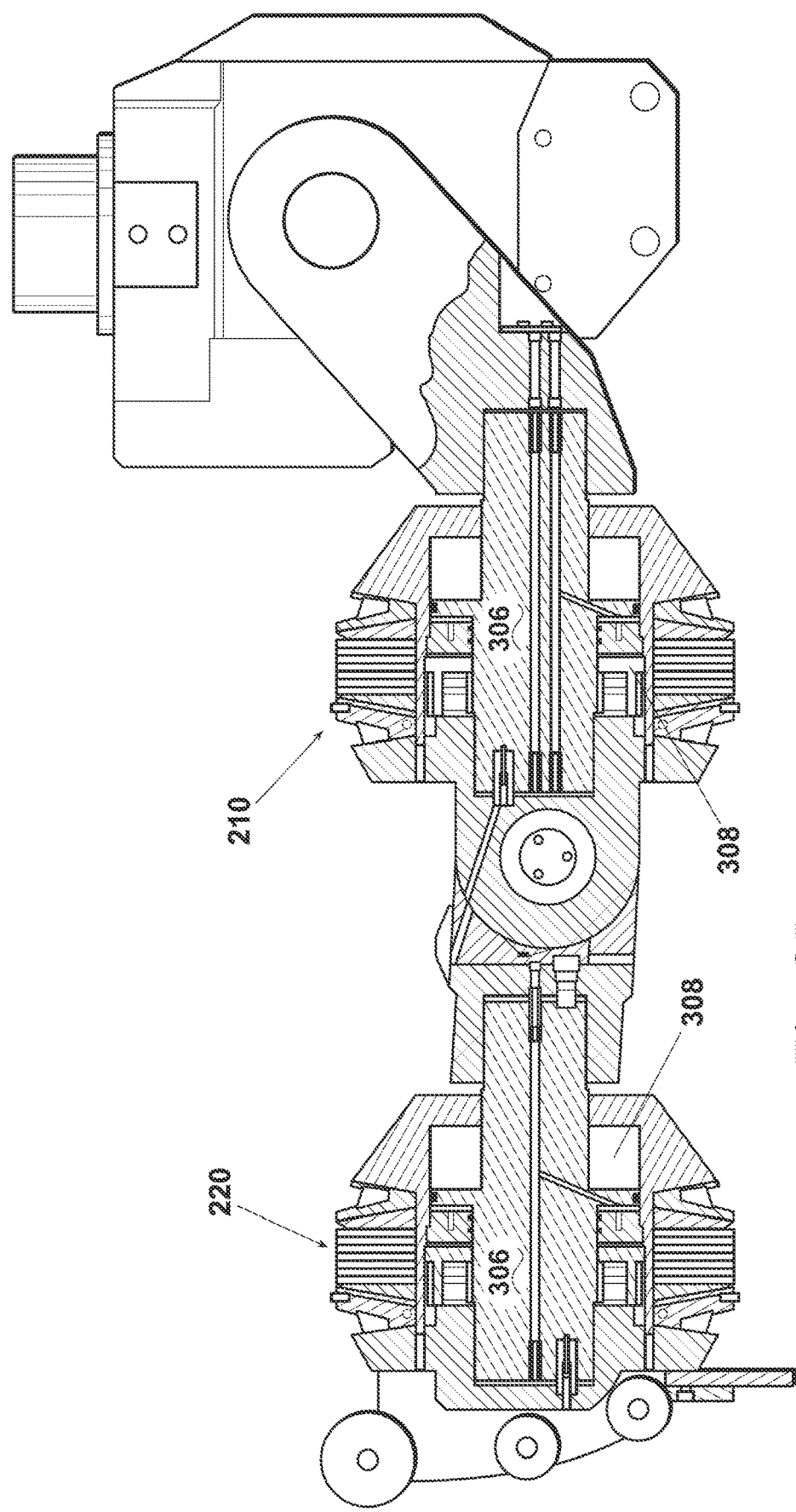
FIG. 35 is an embodiment of the hydraulic cylinder of FIG. 34 integrated into a high pressure plugging head. Use of the hydraulic cylinder is not limited to the T-shaped seal of this disclosure and may be used with other circumferential seal designs.

Referring now to FIGS. 23 & 35, embodiments of an isolation tool 10 of this disclosure may include a first and second plugging head 210, 220 in pivotal relation to one another. When inserted into pipe 20 in a same direction as pipeline product flow, plugging head 210 serves as the primary plugging head (on the higher pressure side of the tool 10, there being a pressure differential across the head 210) and plugging head 220 serves as the secondary plugging head (on the lower pressure side of the tool, there being a pressure differential across the head 220). Each plugging head 210, 220 includes seal 30, pressure heads 40, 50, and segments 60, 80 as previously described. Any pipeline product leaking past the first head 210 is prevented from passing the second head 220. The tool 10, therefore, defines a double barrier or double block because it has two independent sealing systems and two independent locking systems. Bleed or venting of pipeline product can be provided between the heads 210, 220 when in their sealing positions.

When arranged as an intrusive tool, plugging head 210 is pivotally connected by a yoke 214 to a carrier 212. Yoke 214 rotates about a yoke pin 216 contained within a yoke mount 218 connected to carrier 212. Plugging head 220, which may be the secondary plugging head (on the low pressure side of tool 10), is connected to plugging head 210 by a yoke 238 that rotates about a yoke pin 240. Yoke 238 may include a pair of bumpers 242 that help prevent yoke 214 and plugging head 210 from becoming entrapped in the access connection to pipe 20 during installation into, and removal from, the pipe 20.

Figure 36:
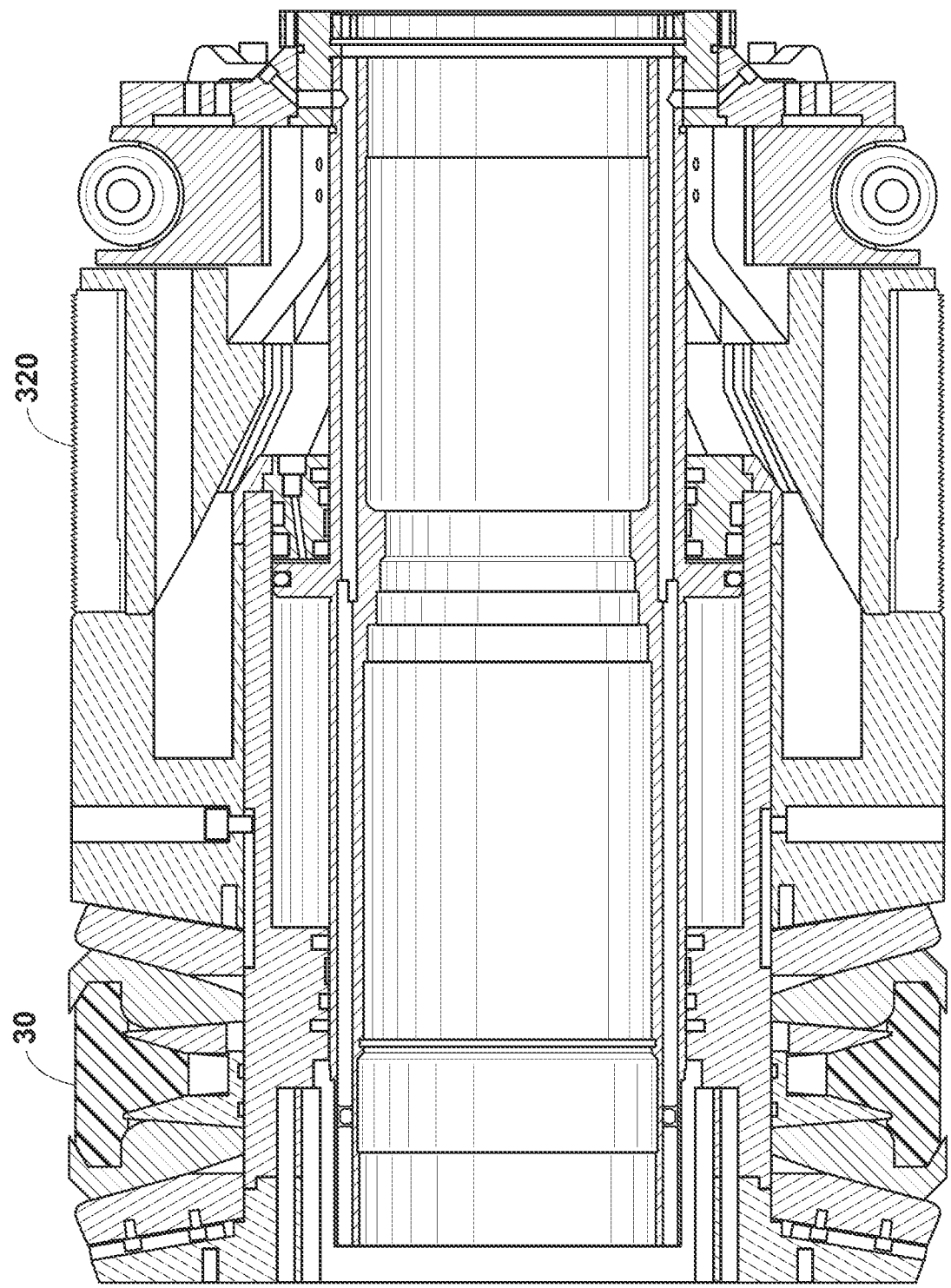
FIG. 36 is an embodiment of a non-intrusive arrangement of the pipeline isolation tool. The tool includes gripping means. Sealing cups or discs of a kind known in the art may be arranged about the tool body to center the tool in the pipe and help propel it forward under differential pressure. Means known in the art may also be used to arrange the tool as part of a plugging train.

In embodiments, the tool 10 travels downward through a lateral access connection and travels into the pipe 20 in a way similar to that described in U.S. Pat. No. 7,841,364 B2 to Yeazel et al. ("Yeazel"), the content of which is incorporated by reference herein. Venting between the heads 210, 220 may occur by way of a bleed port. See e.g. Yeazel. The tool 10 also may be configured as a non-intrusive tool as shown in FIG. 36 and include gripping means 320. Sealing cups or discs of a kind known in the art may be arranged about the tool body to center the tool 10 in the pipe 20 and help propel the tool 10 forward under differential pressure. Means known in the art may also be used to arrange the tool 10 as part of a plugging train. Each plugging head 210, 220 may be a separate module of the plugging train.

Referring to FIGS. 29 to 33, when configured or arranged as an intrusive tool, carrier 212 is connected at its upper end 222 to a control bar 230. The control bar 230 is used, along with control bar head 212 and yokes 214, 238, to radially insert, rotate, and position the tool 10 into a final sealing position within the pipe 20. The control bar 230 also supplies hydraulic fluid to each plugging head 210, 220. In some embodiments, control bar head 212 may be the same or similar to that disclosed in U.S. Pat. No. 10,989,347 to McKone et al.

Some embodiments of the tool 10 may include a control bar 230 that includes an hydraulic transfer sleeve 232 (FIG. 32) that contains a manifold 236 (FIG. 33) that passes hydraulic fluid from outside of the pipe 20 into the isolation tool 10. The hydraulic transfer sleeve 232 includes a set of ports 234 that communicate with a complementary set of ports 238 of the manifold 236. The ports 238 then communicate with external fluid lines.

In embodiments, the leading plugging head 210 or 220 during insertion into pipe 20, may include a chip sweep 250. The chips being swept downstream of the tool 10 by sweep 250 are typically the result of a hot tap operation. The chips may also include other pipeline debris that could interfere with seal 30 when engaging the pipe wall 22. In some embodiments, the sweep 250 may be a urethane disc. In other embodiments, sweep 250 may be supplemented (or replaced) by a nozzle arranged to inject an inert gas such as nitrogen or a liquid, or a pipeline product, ahead of the sweep 250 or tool 10. The nozzle may include ports arranged to draw the gas or liquid into the nozzle by way of venturi effect as the tool 10 is being inserted into the pipe 20.

Referring now to FIGS. 24A to 25D, in some embodiments tool 10 may include an arcuate-shaped bumper 262 that engages with the pipe wall 22 and distribute forces experienced by the tool 10 to the pipe 20. The bumper 262 may be deployed through mechanical means such as an arm 260 or extended or retracted by way of an hydraulic cylinder The arcuate-shaped bumper 262 is moveable between a first position and a second position. When in the first position, the arcuate-shaped bumper 262 is inward of a sealing diameter of the circumferential seal 30. When in the second position, the arcuate-shaped bumper 262 extends to a sealing diameter of the circumferential seal 30.

In one embodiment, the arm 260 is fixed at a lower end 231 of the control bar 230. The arm 260 is arranged to move between a first (non-deployed) position and a second (fully deployed) position as the tool 10 is positioned within the pipe 20. The arm 260 is curved between its two ends 264, 268 and includes an arcuate-shaped bumper 262 at its upper (distal) end 264. The bumper 262 is shaped complementary to the ID of the pipe 20. A linkage 266 is connected at one end 270 to the lower (proximal) end 268 of the arm 260 and is fixed at another end 272 to the yoke 214 or control bar 230. The lower end 268 of the arm 260 includes a cam surface 276 and the end 272 of the-linkage 266 includes a cam 278.

As the yoke 214 travels into the pipeline 20, the yoke 214 pushes the cam 278 and the arm 260 moves between the first and second positions and, when in the second position, the bumper 262 contacts the inner diameter of the pipeline 20. The forces experienced by the tool 10 are distributed to the pipe 20. When in the second position, the arm 260 may overlap a portion of the plugging head 210 but is rearward of the seal 30.

The arm 260 may be sized and arranged so that contact with the ID of the pipe 20 occurs within the length of the pipe 20 that is enclosed by the fitting located on the outside of the pipe 20. The fitting is typically a saddle branch fitting of a kind known in the art for lateral access connections used in hot tapping operations.

Referring now to FIGS. 26A to 27B, transfer pins 290 including a hydraulic passageway 292 may be used between adjacent components of the tool 10 to avoid external hydraulic lines and deliver hydraulic fluid to each plugging head 210, 220. For example, a transfer pin 290 can be placed between a yoke and a piston. The transfer pin 290 includes O-ring grooves 298 at one end and a threaded length 294 at another end. The threaded length 294 may be a standard metric thread. In embodiments, the transfer pin 290 may include a hex-shaped head 296 to accommodate assembly of the tool 10.

Referring to FIGS. 27B to 28B, embodiments of tool 10 may include a spring-loaded anti-rotation pin 300. The anti-rotation pin 300 prevents relative rotation between the nose of the plugging head 210 or 220 and the hydraulically actuated piston 306. The spring may be a wave spring 302.

During assembly of the tool 10, use of the spring 302 in connection with a stem 304 allows an assembler to grab the anti-rotation pin 300 and lock it in the unlocked position. Because the end of the stem 304 is threaded, the assembler and can secure a nut on the end of stem 304 to keep spring 302 compressed.

Figure 37:
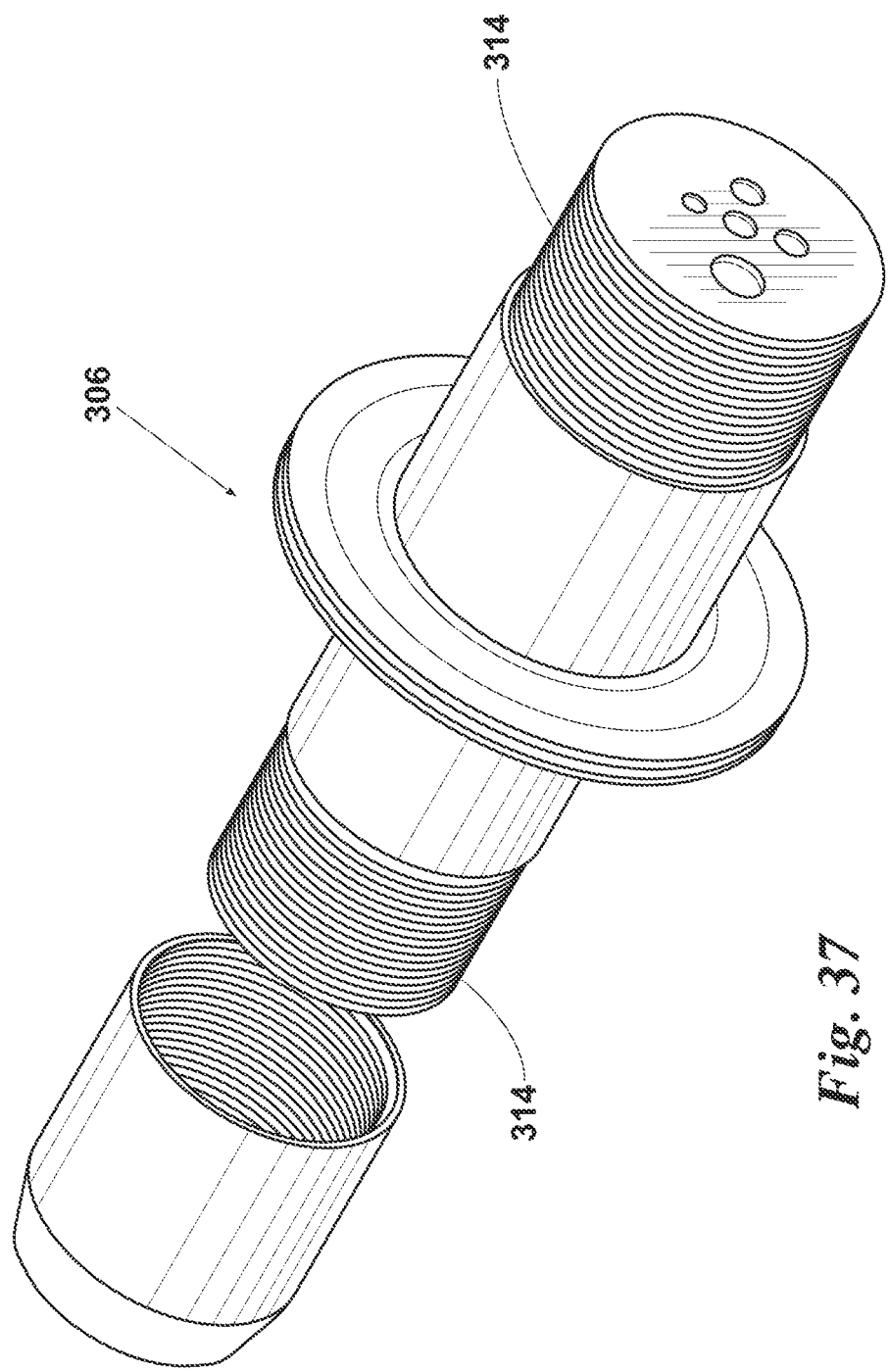
FIG. 37 is an embodiment of a piston and pressure head assembly of this disclosure. The piston includes trapezoidal threads at each end. The threads accommodate variable spacing between the piston and components to which it is connected such that the spacing can be off a much as one full thread turn.

In embodiments, the piston 306 has threads 314 at each end, see FIG. 37, that are not clocked so the gap between the piston 306 and hinge (yoke) 214 can be as much as one whole thread pitch (e.g. a 6 mm thread allows for a gap from 0-6 mm). The threads, which may be trapezoidal threads, allow for variable gap spacing between whatever component is threading onto the piston. In this way, a gap of zero to one full turn may be accommodated in order to have the component and piston 306 clocked properly relative to one another.

Figure 34:
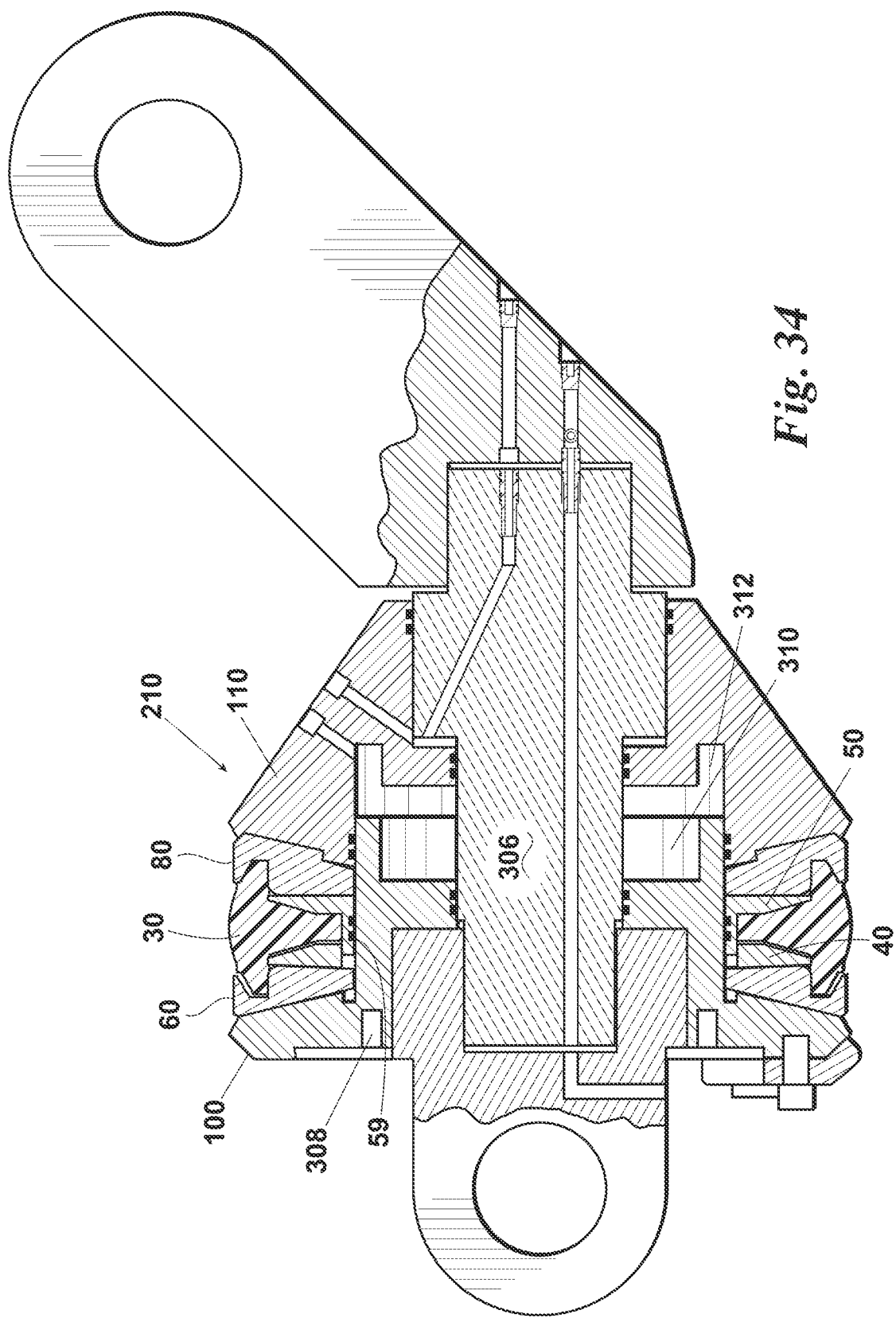
FIG. 34 is an embodiment of a plugging head of this disclosure with a hydraulic cylinder formed at least in part by each of the two pressure heads. The cylinder head may be formed by an opposing pressure head of that forming the cylinder body. Arranging the hydraulic cylinder in this way provides for a shorter overall tool length.

In some embodiment of a plugging head 210 or 220 of this disclosure, a piston or hydraulic cylinder 308 formed, at least in part, by each of the two angle plates 100, 110. See FIGS. 34 & 35. The cylinder 308 may be arranged such that the deactivation volume 310 is greater than that of the actuation volume 312. Compared to embodiments that make use of piston 306, hydraulic cylinder 308 provides for a shorter overall tool length. The cylinder head may be formed by an opposing angle plates 100, 110 of that forming the cylinder body 308. Use of the cylinder 308 is not limited to a T-shaped seal 30 but may be used with other sealing elements. For example, the cylinder 308 may be used with sealing elements the same as or similar to those disclosed by McKone et al.

While embodiments have been described, an isolation tool of this disclosure may be modified by persons of ordinary skill in the art without departing from the scope of the following claims, the elements recited in the claims being entitled to their full range of equivalents.

What is claimed is:

1. A pipeline isolation tool adapted for insertion through a hot tap, the pipeline isolation tool including at least one plugging head comprising:
    a circumferential seal having a first diameter in an unset position and a second diameter larger than the first diameter in a set position; the circumferential seal having in cross section, an upper and a lower seal profile;
    a pair of circumferential pressure heads, one circumferential pressure head on each side of at least the lower seal profile;
    a pair of circumferential angle plates, each circumferential angle plate arranged outward of a corresponding one of the circumferential pressure heads, each circumferential angle plate defining an inner angled surface;
    wherein, one of the circumferential pressure heads includes an axially oriented surface arranged opposite, and adjacent to, a lowermost end of the lower seal profile.

2. The pipeline isolation tool of claim 1, wherein, the circumferential seal has a symmetrical T-shaped cross section, the lower seal profile being radially oriented and the upper seal profile being axially oriented.

3. The pipeline isolation tool of claim 1, further comprising:
    each circumferential pressure head defining an outer surface; and
    a plurality of structural elements on each side of the upper seal profile, each of the plurality structural elements defining an overlap with at least a portion of an adjacent structural element of the plurality and including:
        a concave area for receiving a corresponding portion of the upper seal profile,
        an inner face in contact with the outer surface of a corresponding one of the pair of circumferential pressure heads; and
        an outer face;
    wherein the plurality of structural elements on each side define a first outer diameter when the circumferential seal is in the unset position and define a second outer diameter greater than the first outer diameter when the circumferential seal is in the set position.

4. The pipeline isolation tool of claim 3, wherein, an amount of the overlap of adjacent ones of the plurality of structural elements decreases as the circumferential seal moves from the unset position to the set position and increases as the circumferential seal moves from the set position to the unset position.

5. The pipeline isolation tool of claim 3, further comprising:
    the inner angled surface in contact with a corresponding one of the outer face of each of the plurality of the structural elements.

6. The pipeline isolation tool of claim 3, wherein, the pair of circumferential angle plates and pair of circumferential pressure heads are arranged such that, as the circumferential seal moves from the unset position to the set position, the pair of circumferential angle plates apply pressure to the plurality of structural segments prior to the pair of circumferential pressure heads applying pressure to the radially oriented lower profile of the circumferential seal.

7. The pipeline isolation tool of claim 1, wherein, the axially oriented surface arranged opposite the lowermost end of the lower seal profile is spaced:
    a first radial distance from the axially oriented surface when the circumferential seal is in the unset position; and
    a second radial distance greater than that of the first when the circumferential seal is in the set position, the first and second radial distances being greater than zero.

8. The pipeline isolation tool of claim 1, further comprising:
    a hydraulic cylinder formed at least in part by the pair of circumferential angle plates; and
    a hydraulically actuated piston arranged to move the circumferential seal between the unset and set positions, the hydraulically actuated piston encased within the hydraulic cylinder.

9. The pipeline isolation tool of claim 1, further comprising, a second plugging head pivotally connected to the at least one plugging head.

10. The pipeline isolation tool of claim 1, further comprising:
    a control bar head;
    the at least one plugging head including a circumferential seal;
    a yoke pivotally connected to the control bar head and the at least one plugging head; and
    an arcuate-shaped bumper in communication with the yoke and moveable between a first position and a second position;
    wherein, when in the first position, the arcuate-shaped bumper is arranged inward of a sealing diameter of the circumferential seal; and
    wherein, in the second position, the arcuate-shaped bumper is arranged to a sealing diameter of the circumferential seal.

11. The pipeline isolation tool of claim 10, further comprising; the arcuate-shaped bumper including an arm having a proximal end and a distal end, the arcuate-shaped bumper connected to the distal end of the arm.

12. The pipeline isolation tool of claim 11, wherein, the arm further comprises:
    a cam surface at a proximal end; and
    a linkage including a cam in contact with the cam surface;
    wherein, as the cam moves along the cam surface, the arm moves between the first and second positions.

13. The pipeline isolation tool of claim 1, further comprising:
    the at least one plugging head including a hydraulically actuated piston, the hydraulically actuated piston including at least one end having trapezoidal threads.

14. The pipeline isolation tool of claim 1, further comprising:
    the at least one plugging head including a hydraulically activated piston; and;

a yoke connected to the at least one plugging head, the yoke including a hydraulic fluid passageway; and at least one hydraulic fluid transfer pin including at least one O-ring groove at one end and a threaded length at another end, the at least one hydraulic fluid transfer pin extending between the at least one plugging head and the yoke, wherein the at least one hydraulic fluid transfer pin connects the hydraulic fluid passageway of the yoke to the hydraulically actuated piston.

15. The pipeline isolation tool of claim 14, wherein, the hydraulically actuated piston includes at least one end having trapezoidal threads.

16. The pipeline isolation tool of claim 1, further comprising:
a control bar connectable to the at least one plugging head, the control bar including a hydraulic fluid transfer sleeve containing a manifold, the manifold including a plurality of ports arranged for connection to hydraulic fluid lines located external to the control bar.

17. The pipeline isolation tool of claim 1, further comprising:
the at least one plugging head including a nose;
a hydraulically actuated piston; and
a spring-loaded anti-rotation pin arranged to prevent relative rotation between the nose and the hydraulically actuated piston.

18. The pipeline isolation tool of claim 17, wherein, the spring-loaded anti-rotation pin includes a wave spring.

19. The pipeline isolation tool of claim 17, wherein, the at least one plugging head includes a chip sweep downstream of the circumferential seal.

20. The pipeline isolation tool of claim 17, further comprising:
gripping means located about the pipeline isolation tool.

21. The pipeline isolation tool of claim 17, wherein the hydraulically actuated piston includes at least one end having trapezoidal threads.

22. The pipeline isolation tool of claim 1, further comprising:
a bumper arranged to distribute forces experienced by the pipeline isolation tool to the pipe as the at least one plugging head moves into a sealing position within the pipe.

23. The pipeline isolation tool of claim 22, the bumper including an arm having a proximal end and a distal end, the bumper connected to the distal end of the arm.

24. The pipeline isolation tool of claim 23, wherein the arm is curved between the proximal and distal ends.

25. The pipeline isolation tool of claim 23, wherein the arm further comprises:
a cam surface at the proximal end; and
a linkage including a cam in contact with the cam surface.

26. The pipeline isolation tool of claim 22, wherein the bumper is hydraulically actuated.

27. The pipeline isolation tool of claim 22, comprising the at least one plugging head in communication with a hydraulic fluid circuit, the hydraulic fluid circuit including one or more transfer pins comprising a hydraulic fluid passageway, at least one O-ring groove at one end, and a threaded length at another end.

28. The pipeline isolation tool of claim 27, wherein a transfer pin of the one or more transfer pins extends between the at least one plugging head and a yoke to which the at least one plugging head is connected.

29. The pipeline isolation tool of claim 27, further comprising the at least one plugging head including a hydraulically actuated piston, the hydraulically actuated piston including at least one end having trapezoidal threads.

30. The pipeline isolation tool of claim 29, further comprising a spring-loaded anti-rotation pin arranged to prevent relative rotation between a nose of the pipeline isolation tool and the hydraulically actuated piston.

31. The pipeline isolation tool of claim 1, wherein the upper seal profile is axially oriented.

32. The pipeline isolation tool of claim 1, further comprising: the at least one plugging head in communication with a hydraulic fluid circuit, the hydraulic fluid circuit including one or more transfer pins comprising a hydraulic fluid passageway, at least one O-ring groove at one end, and a threaded length at another end.

33. The pipeline isolation tool of claim 32, wherein a transfer pin of the one or more transfer pins extends between the at least one plugging head and a yoke to which the at least one plugging head is connected.

34. The pipeline isolation tool of claim 32, further comprising the at least one plugging head including a hydraulically actuated piston, the hydraulically actuated piston including at least one end having trapezoidal threads.

35. The pipeline isolation tool of claim 34, further comprising a spring-loaded anti-rotation pin arranged to prevent relative rotation between a nose of the pipeline isolation tool and the hydraulically actuated piston.

36. The pipeline isolation tool of claim 32, further comprising a bumper arranged to distribute forces experienced by the pipeline isolation tool to the pipe as the at least one plugging head moves into a sealing position within the pipe.

37. The pipeline isolation tool of claim 32, wherein the axially oriented surface lies below, and adjacent to, a lowermost end of another of the circumferential pressure heads.

38. The pipeline isolation tool of claim 32, wherein the upper seal profile is axially oriented.

* * * * *